United States Patent [19]

Krutak et al.

[11] Patent Number: 5,106,942
[45] Date of Patent: Apr. 21, 1992

[54] COPOLYMERIZED METHINE COLORANT-POLYESTER COLOR CONCENTRATES

[75] Inventors: James J. Krutak; William W. Parham; Max A. Weaver; Clarence A. Coates, Jr.; Terry A. Oldfield, all of Kingsport, Tenn.

[73] Assignee: Eastman Kodak Company, Rochester, N.Y.

[21] Appl. No.: 461,961

[22] Filed: Jan. 8, 1990

[51] Int. Cl.$^5$ .............................................. C08G 63/20
[52] U.S. Cl. .................................... 528/272; 528/289; 528/290; 528/292; 528/298; 528/302; 528/304; 528/308; 528/308.6; 525/441; 525/445
[58] Field of Search ............... 528/272, 289, 290, 292, 528/298, 302, 304, 308, 308.6; 525/441, 445

[56] References Cited

U.S. PATENT DOCUMENTS 3,931,082  1/1976  Cruz, Jr. et al. ..................... 524/605
4,617,373  10/1986  Pruett et al. ......................... 528/288
4,749,774  6/1988  Weaver et al. ....................... 508/288

*Primary Examiner*—John Kight, III.
*Assistant Examiner*—Sam A. Acquah
*Attorney, Agent, or Firm*—Bernard J. Graves, Jr.; J. Frederick Thomsen; William P. Heath, Jr.

[57] ABSTRACT

Disclose are polyester color concentrates, especially amorphous and partially-crystalline, polyester color concentrates, comprising a polyester having copolymerized therein colored residues of at least one polyester-reactive, thermally-stable methine colorant compound. The color concentrates may be used to impart yellow shades and colors to various polymeric materials, shaped articles fabricated of and coatings formulated from such polymeric materials and, especially, personal, medical and home care products where non-extractability of the colorant material is essential. Also disclosed are colored semicrystalline powders derived from the color concentrates.

40 Claims, No Drawings

COPOLYMERIZED METHINE COLORANT-POLYESTER COLOR CONCENTRATES

This invention pertains to polyester color concentrates comprising a polyester having copolymerized therein colored residues of at least one polyester-reactive, thermally-stable methine colorant compound. The color concentrates may be used to impart yellow shades and colors to various polymeric materials, shaped articles fabricated of and coatings formulated from such polymeric materials and, especially, personal, medical and home care products where non-extractability of the colorant material is essential. This invention also pertains to colored semicrystalline powders derived from the color concentrates.

Plastics, paints, printing inks, rubber, cosmetics and similar materials typically are colored by organic pigments when superior brilliance and tinctorial strength are important. Toxicity considerations have been a chronic problem relative to the use of organic pigments since some have been shown to be potential carcinogens and to cause contact dermatitis. Plastics usually contain various additives such as fillers, plasticizers, colorants, etc. The polymeric base of such plastics normally does not produce allergic or other adverse reactions by themselves but leachable or extractable additives are known [Fregert, Manual of Contact Dermatitis, Munkaard Denmark (2nd Ed. 1981)] to cause contact dermatitis.

The color concentrates provided by this invention have the colorants incorporated into the polymer chain so that the colorant will not be leachable, sublimable or extractable and will not migrate or exude from compositions colored with the color concentrates. The colored semicrystalline powders of our invention may be formulated into a wide variety of products such as cosmetics, household care products and the like which do not pose any risk or hazard to humans since exposure to toxic molecules which may be absorbed by the body is essentially eliminated. The amorphous and semicrystalline color concentrates are preferred for coloring thermoplastic polymeric materials such as polyesters, polycarbonates, polyamides, cellulose esters, polyurethanes, polyolefins, etc. by conventional melt or solution blending techniques.

It is known to color thermoplastic polymeric materials using color concentrates consisting of physical admixtures of polymers and colorants. However, the use of such physical admixtures to color polymeric materials such as polyesters, e.g., poly(ethylene terephthalate) and blends thereof, present a number of problems:

(1) Colorant migration during drying of the colored polymer pellets.
(2) Colorant migration during extrusion and colorant accumulation on dies which can cause film rupture and shut-downs for clean-up, etc. Such colorant migration and accumulation result in time consuming and difficult clean. up when a polymer of another color is subsequently processed in the same equipment.
(3) Colorants may not mix well, for example, when using two or more color concentrates to obtain a particular shade.
(4) Colorants may diffuse or exude during storage of the colored polymeric material.

U.S. Pat. No. 4,617,373 discloses polyester compositions having copolymerized therein low concentrations, e.g., up to 5000 parts per million, of certain methine colorants. The copolymerization of the colorant in a polyester requires the addition of the colorant compound during the preparation of the polyester, e.g., at the commencement of the preparation of the polyester or at the polycondensation stage. The disclosed colored polyesters are suitable for use in the manufacture of various shaped articles, especially containers for beverages, foods, pharmaceutical preparations and cosmetics. It also is known to those skilled in the art that the susceptibility of organic polymer additives, including colorants, to thermal degradation increases dramatically as the concentration of the additives in the polymer increases. Thus, methine colorants which may be copolymerized with polyesters in moderate to high concentrations must possess outstanding stability at the high temperatures commonly employed in the manufacture of high molecular weight polyesters.

The prior art, e.g., U.S. Pat. No. 4,617,373, also discloses polyesters containing methine compounds with one or three or more polyester-reactive groups. Such methine compounds, which function as either polyester chain terminating groups or cross-linking agents, provide polyester compositions which are useful in the manufacture of containers but are totally unsuitable for use in the preparation of the color concentrates of our invention.

The color concentrates provided by this invention comprise a polyester having copolymerized therein at least 1.0 weight percent, based on the weight of the polyester, of the residue of one or more methine colorant compounds having the formula

wherein
A is an aniline, 1,2,3,4-tetrahydroquinoline, 2,3-dihydro-1,4-benzoxazine or 2,3-dihydroindole residue of a methine colorant compound bearing one polyester-reactive substituent; and
B is an unsubstituted or substituted alkoxycarbonyl radical or an aromatic, carbocyclic or heterocyclic radical bearing one polyester-reactive substituent, i.e., a group reactive with at least one of the functional groups of the monomers from which the polyester is prepared; provided that the methine colorant compound contains two polyester-reactive substituents.

The methine colorant compounds of formula (I) and the reacted residues thereof possess the critical property of being sufficiently thermally stable to permit their copolymerization with polyesters by adding them at the start or at an early stage of the polyester preparation. Neither the colorant compounds nor their reacted residues sublime under polymerization conditions and the residues are not extractable from the polyesters. The thermal stability of the methine colorant compounds is particularly important in the preparation of the color concentrates, i.e., polyesters containing from 1.0, especially at least 5.0, to as high as 50 weight percent of colorant residue. The color concentrates are advantageous in that the colorant moiety (1) is stable to light, heat and chemicals, (2) is resistant to sublimation, heat migration, bleeding and leaching by solvents, (3) possesses high color value or chroma and visible light absorption characteristics which allows the color concentrates to be combined with red (magenta) and/or blue (cyan) color concentrates to provide a range of colors, and (4) is safe to humans and the environment.

The colored semicrystalline powders provided by this invention may be derived from the color concentrates by means of a dissolution-crystallization-precipitation technique described in detail hereinbelow. Various processes for the manufacture of finely-divided forms of polyesters have been disclosed in the prior art such as U.S. Pat. Nos. 4,378,228, 4,254,207, 3,586,654, 3,931,082, 4,267,310, 4,305,864, 4,451,606, 3,674,736 and 3,669,922. Some of these known processes include the presence of pigments such as carbon black during particle size reduction to produce colored polyester powders. The known procedures are summarized below.

1. Comminution, as by grinding, which is difficult and expensive and results in highly irregular-shaped particle having a broad range of particle size distribution.
2. Spray drying techniques which tend to produce "hollow shells" or porous particles and also are hazardous when organic solvents are used to dissolve the polyester.
3. Dispersion processes which involve melting the polymer in an inert solvent in the presence of a non-ionic dispersing agent. Polyester, in contrast to other thermoplastic polymers, tend to hydrolyze (decompose) when melted in the presence of water and the particles thus produced have a strong tendency to agglomerate or coalesce.
4. Heating under shearing agitation conditions a condensation polymer in an aprotic liquid which is not a solvent for the polymer and in the presence of a dispersing agent to form small liquid particles and cooling with agitation. Colorants added during this process are still extractable, sublimable, and may exude from the polymer.
5. Solvent induced crystallization wherein an amorphous polymer is initially contacted with a crystal-inducing fluid under certain conditions while the polymer is subjected to physical and/or ultrasonic forces. Colorants added during this process are not reacted with the polymer and therefore are subject to removal from the polymer.
6. Producing microcrystalline polyesters by a hydrolytic removal of amorphous regions of synthetic, linear polyesters followed by a mechanical disintegration of the resulting aggregated microcrystals.
7. Crystallization of polyesters in the presence of nucleating agents.

The prior art does not disclose the preparation of colored microcrystalline polyester powders wherein an amorphous or partially-crystalline polyester, having a thermally-stable, methine colorant compound copolymerized therein, is converted to a colored, microcrystalline, polyester powder by means of a dissolution-crystallization-precipitation procedure. The prior art also fails to disclose microcrystalline, polyester powders containing high levels of colorant incorporated therein which cannot be removed by extraction or sublimation and which does not exude from the surface of the polymer.

Many of the methine colorant compounds useful in our invention and having formula (I) are known compounds as shown by U.S. Pat. Nos. 2,583,614, 2,811,544, 2,850,520, 3,189,641, 3,247,211, 3,326,960, 3,386,491, 3,453,270, 3,553,245, 3,652,636, 3,787,476, 3,808,256, 3,829,461, 3,879,434, 3,920,719, 3,927,063, 4,312,985 and 4,316,013 and the patents and other references disclosed therein. These references also provide a vast number of examples of the aniline, 1,2,3,4-tetrahydroquinoline, 2,3-dihydro-1,4-benzoxazine or 2,3-dihydroindole residues represented by A in formula (I). Examples of such residues include the following radicals:

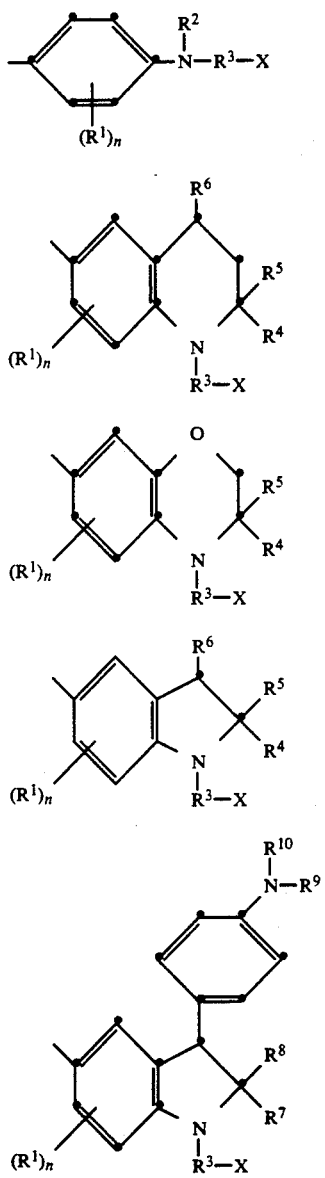

wherein
$R^1$ is lower alkyl, lower alkoxy or halogen;
$R^2$ is an unsubstituted or substituted alkyl, cycloalkyl or aryl radical devoid of polyester-reactive groups;
$R^3$ is a divalent organic group;
$R^4$, $R^5$ and $R^6$ are the same or different and each represents hydrogen or lower alkyl;
$R^7$ and $R^8$ are the same or different and each represents lower alkyl or an unsubstituted or substituted aryl radical;
$R^9$ and $R^{10}$ are the same or different and each represents an unsubstituted or substituted alkyl, cycloalkyl or aryl radical;

n is 0, 1, 2 or 3; and

X is a group reactive with at least one of the functional groups of the monomers from which the polyester is prepared.

Examples of the substituents represented by $R^1$ include methyl, ethyl, propyl, butyl, 2-butyl, methoxy, ethoxy, propoxy, butoxy, chloro, bromo and the like. As used herein to describe an alkyl-containing or alkyl moiety-containing group, "lower" designates a carbon content of up to about 6 carbon atoms.

The unsubstituted and substituted alkyl radicals represented by $R^2$ may contain a total of up to about 20 carbon atoms. Examples of the substituents which may be present on the substituted alkyl radicals include alkoxy; substituted alkoxy such as alkoxy-alkoxy, haloalkoxy and cyanoalkoxy; cyano; halogen; alkanoylamino; acrylamido; aryloxy such as phenoxy and phenoxy substituted with lower alkyl, lower alkoxy, halogen, alkanoylamino, cyano, nitro and/or alkylsulfonyl; cycloalkyl such as cyclohexyl and cyclohexyl substituted with lower alkyl, lower alkoxy and/or halogen; alkylsulfonyl; vinylsulfonyl; groups having the formulas

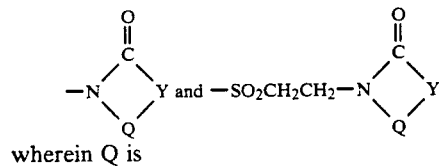

wherein Q is

—$SO_2$— or —$CH_2$—and Y is 1,2- or 1,3-alkanediyl, 1,2-cyclohexylene, 1,2-phenylene or 1,2-phenylene substituted with lower alkyl, lower alkoxy, halogen or nitro; or when Q is carbonyl Y also may be —$OCH_2$—, —$OCH_2CH_2$—, —$CH_2OCH_2$—, —$SCH_2$—, —$CH_2SCH_2$—, —$NHCH_2$—, —$NHCH_2CH_2$—, —$N(alkyl)CH_2$—, —$N(alkyl)CH_2CH_2$—or —$NHC(C_6H_5)_2$—; groups having the formula —S—$R^{11}$ —$SO_2CH_2CH_2S$—$R^{11}$

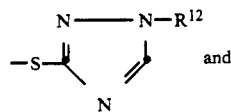

and

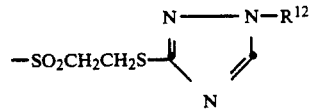

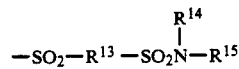

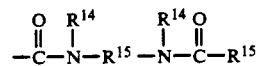

wherein $R^{11}$ is lower alkyl, cycloalkyl, aryl or heteroaryl such as pyridyl, pyrimidinyl, benzoxazolyl, benzothiazolyl, benzimidazolyl, 1,3,4-thiadiazolyl and 1,3,4-oxadiazolyl; $R^{12}$ is hydrogen, alkyl or alkyl substituted with aryl; $R^{13}$ is alkyl, cycloalkyl, alkylcycloalkyl, phenyl or phenyl substituted with lower alkyl, lower alkoxy or halogen; $R^{14}$ and $R^{15}$ are independently selected from hydrogen and the substituents which $R^{13}$ can represent.

The organic linking group represented by $R^3$ is bonded to the adjacent nitrogen atom of residue A through non-oxo carbon atoms, e.g., unsubstituted or substituted methylene groups, a methylidene group and an unsubstituted methylene group or a nuclear carbon atom of a carbocyclic or heterocyclic aromatic group. Thus, linking group $R^3$ may be selected from a wide variety of alkylene, alkenylene, alkynylene, cycloalkylene, carbocyclic and heterocyclic arylene and combinations of such divalent groups. The alkylene linking groups may contain within their main chain hetero atoms, e.g., oxygen, sulfur, sulfonyl, nitrogen, substituted nitrogen, and/or cyclic groups such as cycloalkylene, carbocyclic arylene or divalent aromatic heterocyclic groups. Examples of alkylene linking groups containing a cyclic moiety in the linking chain include:

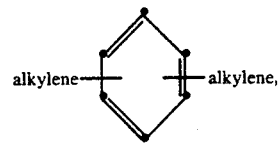

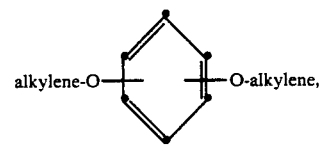

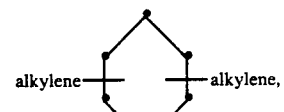

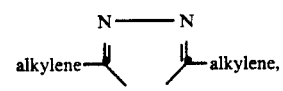

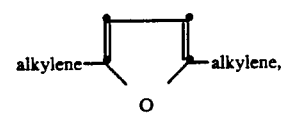

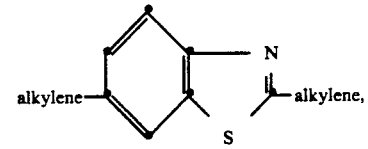

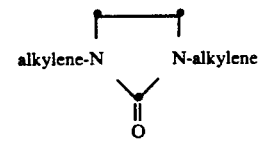

and

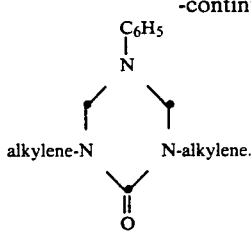

The carbocyclic groups may be cycloalkylene such as 1,2-, 1,3 and 1,4-cyclohexylene, 1,2-, 1,3- and 1,4-phenylene and 2,6- and 2,7-naphthylene. Examples of the divalent heterocyclic groups include unsubstituted and substituted triazines such as 1,3,5-triazin-2,4-diyl and 6-methoxy-1,3,5-triazin-2,4-diyl; diazines such as 2,4-pyrimidindiyl, 6-methyl-2,4-pyrimidindiyl, 6-phenyl-2,4-pyrimidindiyl, 3,6-pyridazindiyl and 2-methyl-3-oxo-4,5-4,5-pyridazindiyl; dicyanopyridines such as 3,5-dicyano-2,6-pyridindiyl and 4-phenyl 3,5-cyano-2,6-pyridindiyl; quinolines and isoquinolines such as 2,4-quinolindiyl and 2,8-isoquinolinediyl; quinoxalines such as 2,3-quinoxalindiyl; and azoles such as 2,5-thiazoldiyl, 5-methylene-2-thiazolyl, 3,5-isothiazoldiyl, 5-methylene-3-isothiazolyl, 1,3,4-thiadiazol-2,5-diyl, 1,2,4-thiadiazol-3,5-diyl, 2,6-benzothiazoldiyl, 2,5-benzoxazoldiyl, 2,6-benzimidazoldiyl, 6-methylene-2-benzothiazolyl and the group having the structure:

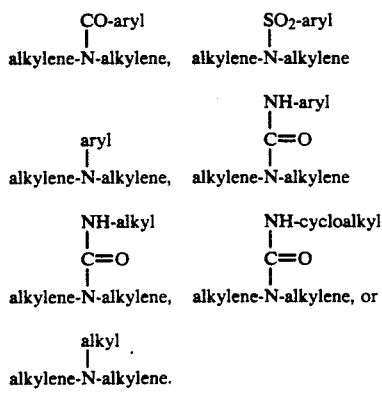

and maleimides such as 1-methyl-3,4-maleimidediyl and 1-phenyl-3,4-maleimidediyl. The acyclic moieties of the linking group represented by $R^3$ also may be substituted, for example, with alkoxy, halogen, cyano, aryl, aryloxy, cycloalkyl, etc. The cyclic moieties of linking group $R^3$ may be substituted with alkyl as well as with the substituents already mentioned. In addition to the possible substitution described above, the nitrogen atom of the nitrogen containing alkylene groups may be substituted, for example, with alkyl, aryl, alkanoyl, aroyl, alkylsulfonyl, or carbamoyl, e.g.,

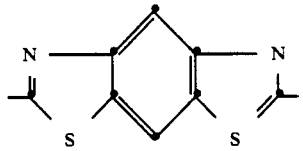

Examples of the reactive groups which X may represent include hydroxy, carboxy, an ester radical, amino, alkylamino, and the like. The ester radicals may be any radical having the formula

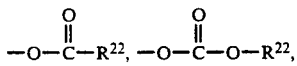

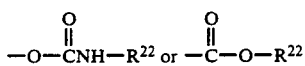

wherein $R^{22}$ is selected from the unsubstituted or substituted alkyl, cycloalkyl or aryl radicals set forth in the above definition of $R^2$. $R^{22}$ preferably is unsubstituted alkyl, e.g., alkyl of up to about 8 carbon atoms, or phenyl, and most preferably, lower alkyl, e.g., methyl and ethyl. Reactive group X preferably is hydroxy or alkanoyloxy of up to about 4 carbon atoms, e.g., acetoxy.

The radicals represented by —$R^3$—X also include methine group-containing radicals having the structure

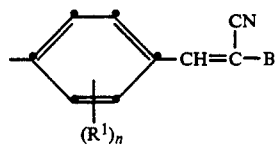

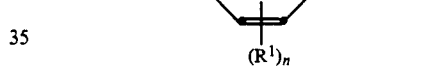

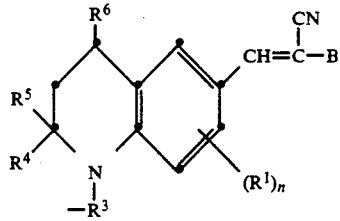

wherein $R^1$, $R^2$, $R^3$, $R^4$, $R^5$, $R^6$, n and B are defined above. The methine colorant compounds wherein —$R^3$—X collectively represents one of the above methine group-containing radicals are referred to herein as bismethine colorants.

For the methine colorant compounds of formula (I), divalent linking group $R^3$ preferably is alkylene, alkylene-O-alkylene, alkylene-S-alkylene, alkylene-SO$_2$N(R$^{14}$)-alkylene, alkylene-N(SO$_2$R$^{13}$)-alkylene, alkylene-arylene, alkylene-O-arylene, alkylene-S-arylene, alkylene-arylene-SO$_2$N(R$^{14}$)-alkylene, alkylene-O-arylene-SO$_2$N(R$^{14}$)-alkylene, alkylene-SO$_2$N(R$^{14}$)-arylene, alkylene-N(SO$_2$R$^{13}$)-arylene, alkylene-CON(R$^{14}$)-alkylene, alkylene-CON(R$^{14}$)-arylene, alkylene-N(COR$^{13}$)-alkylene, alkylene-N(COR$^{13}$)-arylene, alkylene-SO$_2$-arylene, alkylene-cyclohexylene-alkylene, alkylene-arylene-alkylene, cyclohexylene, arylene, arylene-alkylene-arylene-O-alkylene, arylene-SO$_2$N(R$^{14}$)-alkylene, and arylene-SO$_2$N(R$^{14}$)-arylene and X is hydroxyl or a group having the formula:

wherein each alkylene contains 2 to 8 carbon atoms, each arylene is phenylene or phenylene substituted with lower alkyl, lower alkoxy or halogen, $R^{13}$ is alkyl, cyclohexyl, phenyl or phenyl substituted with lower alkyl, lower alkoxy or halogen, and $R^{14}$ is hydrogen or one of the groups which $R^{13}$ can represent.

For the bis-methine compounds of formula (I) wherein the divalent group $R^3$ links two aniline or tetrahydroquinoline residues together, e.g., bis-methine compounds having the structures

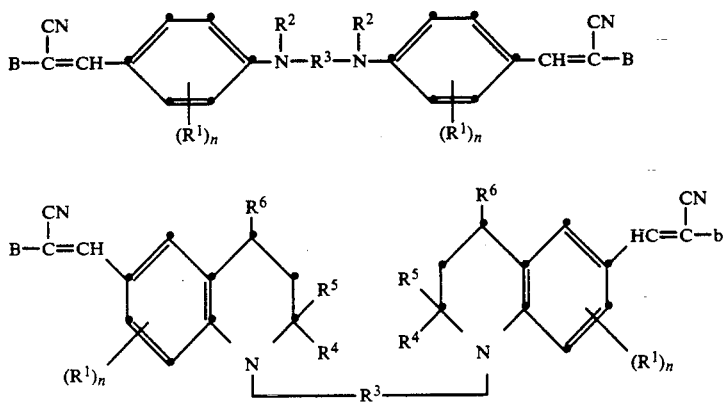

$R^3$ preferably is alkylene, arylene, alkylene-arylene-alkylene, alkylene-cyclohexylene-alkylene, alkylene-O-alkylene, alkylene-S-alkylene, alkylene-SO$_2$-alkylene, alkylene-N(SO$_2$N$^{13}$)-alkylene, alkylene-N(R$^{13}$)-alkylene,

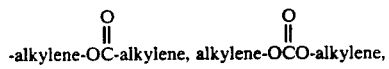

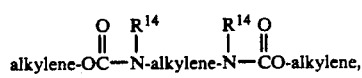

or alkylene-O-arylene-alkylene wherein each alkylene contains 2 to 8 carbon atoms, each arylene is phenylene or phenylene substituted with lower alkyl, lower alkoxy or halogen, $R^{13}$ is alkyl, cyclohexyl, phenyl or phenyl substituted with lower alkyl, lower alkoxy or halogen, and $R^{14}$ is hydrogen or one of the groups which $R^{13}$ can represent.

Examples of the alkyl groups represented by $R^4$, $R^5$ and $R^6$ are set forth in the preceding description of $R^1$. Representative examples of the alkyl, cycloalkyl and aryl radicals which each of $R^7$, $R^8$, $R^9$ and $R^{10}$ can represent are set forth in the above description of $R^2$.

The alkoxycarbonyl radicals represented by B in formula (I) include radicals having the formula

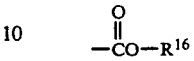

wherein $R^{16}$ is an unsubstituted or substituted alkyl, cycloalkyl or aryl radical set forth hereinabove in the definition of $R^2$. Examples of the heteroaromatic, i.e., heterocyclic aryl, radicals bearing one polyester-reactive substituent which B may represent include radicals having the formula

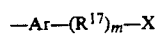

wherein Ar is a divalent, aromatic, carbocyclic or heterocyclic radical, $R^{17}$ is a divalent linking group as defined in the preceding definition of $R^3$, X is defined hereinabove and m is 0 or 1. Examples of the carbocyclic arylene radicals represented by Ar include 1,2- 1,3- and 1,4-phenylene, unsubstituted or substituted with lower alkyl, lower alkoxy or halogen.

Examples of the divalent heterocyclic groups include unsubstituted and substituted triazines such as 1,3,5-triazin-2,4-diyl and 6-methoxy-1,3,5- triazin-2,4-diyl; diazines such as 2,4-pyrimidindiyl, 6-methyl-2,4-pyrimidindiyl, 6-phenyl-2,4-pyrimidindiyl, 3,6-pyridazindiyl and 2-methyl-3-oxo-4,5-4,5-pyridazindiyl; dicyanopyridines such as 3,5-dicyano-2,6-pyridindiyl and 4-phenyl-3,5-cyano-2,6-pyridindiyl; quinolines and isoquinolines such as 2,4-quinolindiyl and 2,8-isoquinolinediyl; quinoxalines such as 2,3-quinoxalindiyl; and azoles such as 2,5-thiazoldiyl, 5-methylene-2-thiazolyl, 3,5-isothiazoldiyl, 5-methylene-3-isothiazolyl, 1,3,4-thiadiazol-2,5-diyl, 1,2,4-thiadiazol-3,5-diyl, 2,6-benzothiazoldiyl, 2,5-benzoxazoldiyl, 2,6-benzimidazoldiyl, 6-methylene-2-benzothiazolyl and the like.

The methine colorant compounds which are especially preferred for use in our invention have the structures

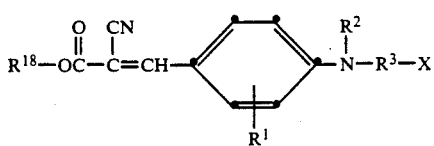
(II)

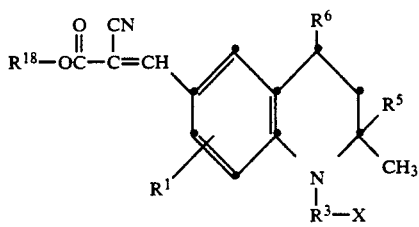
(III)

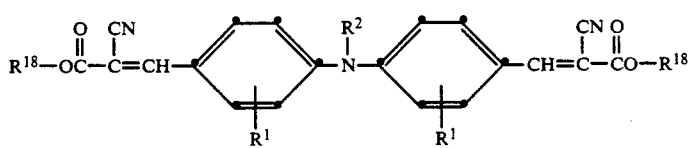
(IV)

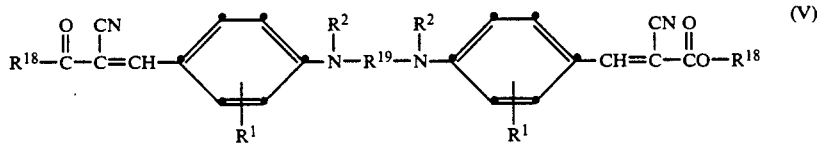
(V)

wherein
$R^1$ is hydrogen, methyl, methoxy, ethoxy or chloro;
$R^2$ is lower alkyl; lower alkyl substituted with cyclohexyl, phenyl, phenoxy, lower alkoxy, halogen or cyano; allyl; cyclohexyl; or phenyl;
$R^3$—X is alkylene-OH, alkylene-O-alkylene-OH, $$\text{alkylene-O}\overset{\overset{O}{\|}}{C}\text{-alkyl, alkylene-O}\overset{\overset{O}{\|}}{C}\text{O-alkyl,}$$

$$\text{alkylene-phenylene-}\overset{\overset{O}{\|}}{C}\text{O-alkyl,}$$

$$\text{alkylene-O-phenylene-}\overset{\overset{O}{\|}}{C}\text{O-alkyl or}$$

wherein each alkylene contains 2 to about 4 carbon atoms and each alkyl contains up to about 4 carbon atoms;
$R^5$ and $R^6$ each is hydrogen or methyl;
$R^{18}$ is lower alkyl; and
$R^{19}$ is alkylene, alkylene-O-alkylene, alkylene-SO$_2$-alkylene, alkylene-phenylene-alkylene, alkylene-O-phenylene-O-alkylene, $$\text{alkylene-O}\overset{\overset{O}{\|}}{C}\text{-alkylene-}\overset{\overset{O}{\|}}{C}\text{O-alkylene}$$

or $$\text{alkylene-O}\overset{\overset{O}{\|}}{C}\text{-phenylene-}\overset{\overset{O}{\|}}{C}\text{O-alkylene.}$$

The methine colorant compounds which may be used in the preparation of the compositions provided by this invention are further described in the following examples. Examples of colorant compounds not suitable for use in our invention are described in Comparative Examples 1 through 3. The identity of the colorant compounds prepared in the examples is confirmed by mass spectrometry analysis.

EXAMPLE 1

N-(2-Acetyloxyethyl)-N-ethyl-m-toluidine (66.3 g, 0.30 mol) is added to N,N-dimethylformamide (150 mL). With stirring and cooling, phosphorous oxychloride (46.5 g, 0.304 mol) is added dropwise at 30°–45° C. After addition is completed, heating is continued at 85°–90° C. for 1.5 hours. The reaction mixture is then added dropwise to a stirred mixture of methyl cyanoacetate (34.6 g, 0.35 mol), sodium acetate (93.8 g) and isopropyl alcohol (300 mL) at 50°–60° C. Heating is continued at 60°–65° C. for 1.5 hours and then water (500 mL) is added dropwise to precipitate the yellow product. After being cooled to about 25° C., the product is collected by filtration, washed well with warm water, and dried in air. The yield is 87.0 g (87.9% of theory) of methyl 3-[4-[[2-(acetyloxy)ethyl]ethylamino]-2-methylphenyl]-2-cyano-2-propenoate, which melts at 101°–102° C., as evidenced by mass spectrometry.

An absorption maximum ($\lambda_{max}$) is observed at 428 nm ($\epsilon_{max}$=43,340) in the visible spectrum in acetone. The colorant may be further purified by recrystallization from methanol in presence of activated charcoal if needed.

EXAMPLE 2

To a solution of N-(2-acetyloxy)ethyl-1,2,3,4-tetrahydro-2,2,4,7-tetramethylquinoline (55.0 g, 0.20 mol) in N,N-dimethylformamide (150 mL) is added phosphorous oxychloride (20 mL) at 15°–20° C. with good stirring. The reaction mixture is heated for 1 hour at 90-°95° C., cooled to 25° C., and added dropwise to a stirred mixture of methyl cyanoacetate (19.8 g, 0.20 mol) and sodium acetate (80.0 g) in isopropanol (350 mL) at about 50° C. Heating is continued at 90°-95° C. for 1 hour, the reaction mixture cooled, and water (3L) is added to precipitate the yellow product. The cake is pressed as dry as possible, recrystallized from ethanol (1150 mL) and dried to yield 67.6 g (87.9% of theory), m.p. 134°-5° C.) of methyl 3-[1-[2-(acetyloxy)ethyl]-1,2,3,4-tetrahydro-2,2,4,7-tetramethyl-6-quinolyl]-2-cyano-2-propenoate.

The yellow colorant has an absorption maximum $\lambda_{max}$) at 437 nm in the visible absorption spectrum in acetone.

EXAMPLE 3

Bis[2-[(3-methylphenyl)ethylamino]ethyl]hexanedioate (93.6 g, 0.20 mol) and N,N-dimethylformamide (200 mL) are mixed and heated with stirring until complete solution is obtained. Phosphorous oxychloride (42 mL) is added at 15°-25° C. The reaction mixture is heated at 90°-95° C. for 1.5 hours and then cooled to about 50° C. A mixture of methyl cyanoacetate (41.0 g, 0.41 mol), sodium acetate (120 g) and isopropanol (500 mL) is added gradually to the Vilsmeier reaction mixture and heating continued at 65°-75° C. for 2 hours. After cooling to about 25°-30° C., the reaction mixture is treated dropwise with 1000 mL of water to precipitate the yellow product, which is collected by filtration, washed with water, and dried in air. The yield is 120 g (88.4% of the theory) of bis[2-[[4(2-cyano-3-methoxy-3-oxy-1-propenyl)3-methylphenyl]ethylamino]ethyl]hexanedioate which is consistent with mass spectrometry. The product is purified by recrystallization from 2-ethoxyethanol (500 mL). A visible absorption maximum ($\lambda_{max}$) is observed in the visible absorption spectrum in methylene chloride ($\epsilon=80,789$).

EXAMPLE 4

N,N'-(Sulfonyldiethylene)-bis-(N-ethyl-m-toluidine) (77.6 g, 0.20 mol) is treated according to the procedure described in Example 3 to obtain 117.4 g (97.0% of the theory) of product having the structure:

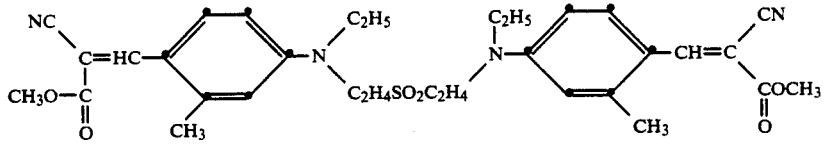

Recrystallization of the product from 2-ethoxyethanol (500 mL) in presence of charcoal (5.0 g) gave the pure yellow colorant (81.0 g), which has a $\lambda_{max}$ at 417 nm in the visible absorption spectrum ($\epsilon=68,757$) in methylene chloride solvent.

EXAMPLE 5

Malononitrile (16.5 g, 0.25 mol), ethanol (23.8 g, 0.52 mol), ethyl acetate (90.0 g) are mixed together and stirred. Acetyl chloride (21.0 g, 0.25 mol) is added dropwise at 25°-30° C. and the reaction mixture is stirred at room temperature for about 4 hours. To the immediate solution is added methyl 3-amino-4-hydroxybenzoate (35.8 g, 0.25 mol). The reaction mixture is heated to reflux for 2 hours and then treated with 2-ethoxyethanol (193 g). As refluxing is continued, distillate is removed (approximately 150 mL) using a distillation head. After cooling to room temperature, the reaction mixture is treated with sodium acetate (68.5 g), followed by a solution of Vilsmeier reaction complex prepared by adding phosphorous oxychloride (42.4 g) to a solution of N-(2-acetyloxy)ethyl-N-ethyl-m-toluidine (55.3 g, 0.25 mol) dissolved in N,N-dimethylformamide (100 mL) and heating for 2 hours at 90°-95° C. and cooling. The condensation reaction is then completed by heating the mixture at 95° C. for 0.5 hours. After being cooled to about 50° C., the yellow colorant is precipitated by the addition of water, collected by filtration, washed with water and air dried. Purification is accomplished by reslurrying the yellow solid in hot methanol, cooling, filtering, and washing with methanol. The yield is 60.5 g of pure methyl 2-[2-cyano-[4-[[2-acetyloxyethyl)ethyl]amino]-2-methylphenyl]ethylidene]-5-benzoxazole carboxylate.

In the visible absorption spectrum in methylene chloride, an absorption maximum ($\lambda_{max}$) is observed at 447 nm ($\epsilon=43,976$).

EXAMPLE 6

A solution of N-methyldiphenylamine (91.5 g, 0.50 mol) and N,N-dimethylformamide (200 mL) is cooled and stirred. Phosphorous oxychloride (100 mL) is added dropwise at 25°-30° C. and the reaction mixture is then heated and stirred at about 90° C. for 21 hours followed by drowning into water-ice mixture (1.5L). A sticky mixture results which is basified by adding 50% sodium hydroxide. The aqueous layer is decanted and the sticky product washed once with water by decantation and then treated with 300 mL methanol. Crystallization occurs and the product is collected by filtration and washed with methanol. The wet product is reslurried in methanol, filtered, washed with methanol, and dried in air (yield - 52.5 g, 43.9% of the theory). Mass spectrometry indicates that the product consists mostly of 4,4'-(methylimino)-bis-benzaldehyde with a small amount of the mono-aldehyde present.

A mixture of 4,4'-(methylimino)-bis-benzaldehyde (35.9 g, 0.15 mol) methyl cyanoacetate (30.0 g, 0.30 mol), methanol (200 mL) and piperidine acetate (2.0 g) is heated at reflux. After about 5 minutes at reflux, the yellow product begins to crystallize and the reaction mixture becomes very thick. Additional methanol (400 mL) is added to keep the mixture stirrable and refluxing is continued for 0.5 hours. The yellow product is collected by filtration, washed with methanol, and dried in air. The yield is 48.0 g (79.8% of theory) of the yellow methine colorant dimethyl 3,3'[(methylimino)di-4,1-phenylene]bis[2-cyano-2-propenoate] which has an absorption maximum ($\lambda_{max}$) at 449 nm in methylene chloride ($\epsilon=49,319$).

COMPARATIVE EXAMPLE 1

To a solution of N,N-bis[2-(acetyloxy)ethyl]-m-toluidine (139.5 g, 0.50 mol) in N,N-dimethylformamide (200 mL) is added phosphorous oxychloride (50 mL) at less than 25° C. After being heated for 2 hours at 90°-95° C., the reaction mixture is drowned on ice-water mixture and neutralized with 50% sodium hydroxide solution. Extraction with 2-100 mL portions of methylene chloride, followed by removal of the solvent on rotary evaporator affords the aldehyde as a dark viscous oil (139.0 g, 90.5% of theory).

A portion of the aldehyde (4-[bis[2-(acetyloxyethyl)]amino]2-methylbenzyldehyde) thus prepared (92.1 g, 0.30 mol) malononitrile (20.5 g, 0.31 mol), methanol (200 mL) and piperidine (12 drops) are mixed and heated with stirring at reflux for 3 hours. The reaction mixture is cooled and the yellow product collected by filtration, washed with methanol, and dried in air. A yield of 76.2 g (71.5% of theory) of the yellow colorant is obtained. Recrystallization from methanol (300 mL) in the presence of charcoal (5 g) gives 66.5 g of the pure product, [[4-[bis[2-(acetyloxy)ethyl]amino]-2-methylphenyl]methylene]-propanedinitrile, which has a visible absorption maximum at 431 nm ($\epsilon = 52,440$) in the visible absorption spectrum in methylene chloride.

COMPARATIVE EXAMPLE 2

A solution of N,N-bis[2-(ethoxycarbonyl)ethyl]-m-toluidine (92.1 g, 0.30 mol) in N,N-dimethylformamide (150 mL) is treated dropwise with phosphorous oxychloride (0.30 mol) at 10°–25° C. After being heated at about 90° C. for 1.5 hours, the solution is cooled to room temperature and added to a stirred mixture of malononitrile (20.5 g, 0.31 mol), sodium acetate (94.0 g) and isopropanol (300 mL) below 50° C. The reaction mixture is heated at 60°–65° C. for 1.5 hours, diluted by addition of water (750 mL), and filtered. The product, [[4-bis[2-(ethoxycarbonyl)ethyl]]amino]-2-methylphenyl]methylene]-propanedinitrile, is washed with water and then ethanol (200 mL) followed by drying in air (yield-98.6 g.85.8% of the theoretical yield). Pure product is obtained by recrystallization from ethanol (700 mL) in the presence of charcoal (5 g).

In the visible absorption spectrum in methylene chloride, an absorption maximum ($\lambda_{max}$) is observed at 431 nm ($\epsilon = 53,072$).

COMPARATIVE EXAMPLE 3

A mixture of 4-(bis(phenylmethyl)amino]benzaldehyde (60.2 g, 0.20 mol), methyl cyanoacetate (21.8 g, 0.22 mol), methanol (300 mL), and piperidine (10 drops) is heated at reflux for 1.5 hours. After cooling, the yellow product is collected by filtration, washed with methanol, and dried in air. The yellow colorant, methyl 3-[4-[bis(phenylmethyl)amino]phenyl]-2-cyanopropenoate, is obtained in a yield of 53.5 g (70.0% of theory).

In methylene chloride solvent, the colorant has an absorption maximum ($\lambda_{max}$) at 417 nm ($\epsilon = 49,815$) in the visible absorption spectrum.

Additional examples of methine colorant compounds useful in the preparation of the color concentrate compositions of this invention are set forth in the following tables. These colorant compounds may be prepared according to the procedures described in the preceding examples and conform to the formulas set forth in each table.

TABLE I

Structure: B—C(CN)=CH—C₆H₃(R¹)—N(R²)—R³—X (benzene ring positions 2, 3)

| Example | B | R¹ | R² | R³—X |
|---|---|---|---|---|
| 7 | —COOCH₃ | H | —C₆H₁₁ | —CH₂CH₂OOCCH₃ |
| 8 | —COOC₂H₅ | H | —CH₂C₆H₅ | —CH₂CH₂OOCCH₃ |
| 9 | —COO(CH₂)₄H | 2,5-di-OCH₃ | —C₂H₅ | —CH₂CH₂OOCCH₃ |
| 10 | —COOCH₂CH₂OH | 3-Cl | —CH₂CH=CH₂ | —(CH₂CH₂O)₂OCCH₃ |
| 11 | —COOCH₂CH₂CN | 3-Br | —(CH₂)₄H | —(CH₂CH₂O)₄H |
| 12 | —COOC₆H₅ | 2-OCH₃-5-CH₃ | —CH₂CH₂OC₂H₅ | —CH₂CH₂C₆H₄-4-COOH |
| 13 | —COOCH₂CH₂C₆H₅ | 2,5-di-CH₃ | —CH₂CH₂OC₆H₅ | —CH₂CH₂SCH₂CH₂OH |
| 14 | —COOCH₂CH₂C₆H₅ | 2-OCH₃-3-Cl | —CH₂CH₂Cl | —CH₂CH₂OC₆H₄-4-COOCH₃ |
| 15 | —COOCH₂CH₂Cl | H | —CH₂C₆H₅ | —CH₂CH₂SC₆H₄-4-COOCH₃ |
| 16 | —COOCH₂CH₂OC₂H₅ | 3-CH₃ | —C₆H₁₀-4-CH₃ | —CH₂CH₂N(SO₂CH₃)CH₂CH₂OH |
| 17 | —COOCH₂CH₂N(CH₂)₃CO | 3-CH₃ | —CH₂C₆H₁₁ | —CH₂CH₂SO₂NHCH₂CH₂OH |
| 18 | —COOCH₂C₆H₁₁ | 3-CH₃ | —CH₂CH₂CN | —CH₂CH₂SO₂N(CH₃)CH₂CH₂OH |
| 19 | —COO(CH₂)₃CONH₂ | 3-CH₃ | —CH₂CH₂C₆H₁₁ | —CH₂CH₂SO₂NHC₆H₄-4-CH₂CH₂OH |
| 20 | —COOCH₂C(CH₃)₂CONH₂ | 3-CH₃ | —C₂H₅ | —CH₂C₆H₄-4-SO₂NHCH₂C(CH₃)₂CH₂OH |
| 21 | —COO(CH₂CH₂O)₂CH₃ | 3-CH₃ | —(CH₂)₃SO₂CH₃ | —CH₂CH₂OC₆H₄-4-SO₂NHCH₂CH₂OH |
| 22 | —COOCH₂CH(OH)CH₂Cl | 3-CH₃ | —CH₂CH₂CON(CH₃) | —CH₂CH₂SO₂C₆H₄-3-COOCH₃ |
| 23 | —COOCH₂CH=CHCH=CHO | 3-CH₃ | —CH₂CH₂NC(O)CH₂CH₂CO | —CH₂CH₂SC₆H₄-2-COOH |
| 24 | —COOCHC₆H₁₀-4-CH₂OH | 3-CH₃ | —CH₂CH₂NC(O)-o-C₆H₄CO | —CH₂CH₂CONHC₆H₄-4-CH₂CH₂OH |
| 25 | —COOCH₂CH(CH₃)₃O | 3-CH₃ | —CH₂CH₂NC(O)-o-C₆H₄SO₂ | —CH₂CH₂N(COC₆H₅)CH₂CHOH |
| 26 | —COOC₆H₄-4-OCH₃ | 3-CH₃ | —CH₂CH₂NCH₂-o-C₆H₄CO | —(CH₂)₃OH |
| 27 | —COOCH₂SCH₂NC(O)CH₂CH₂CO | 3-CH₃ | —CH₂CH₂SC=N-o-C₆H₄S | —(CH₂)₄OOC₆H₅ |
| 28 | —COO(CH₂)₆OH | 3-CH₃ | —CH₂CH₂SO₂C₆H₅ | —(CH₂)₃OOCOC₂H₅ |
| 29 | —COO(CH₂)₄OH | 3-CH₃ | —CH₂CH₂Br | —CH₂CH₂CON(C₆H₅)CH₂CH₂OH |
| 30 | —COO(CH₂)₁₀OH | 3-CH₃ | —CH₂CHF₂ | —CH₂CH₂CONHCH₂C(CH₃)₂CH₂OH |

TABLE I-continued $$B-C=CH-\underset{R^1}{\underset{|}{C_6H_4}}-N\underset{R^2}{\overset{R^2}{\underset{|}{-}}}R^3-X$$

| Example | B | $R^1$ | $R^2$ | $-R^3-X$ |
|---|---|---|---|---|
| 31 | —COOCH$_2$CHF$_2$ | H | —CH$_2$CH$_2$SC$_2$H$_5$ | —CH$_2$C$_6$H$_{10}$-4-CH$_2$OH |
| 32 | —COOC$_6$H$_{10}$-4-CH$_3$ | H | —CH$_2$CH$_2$OC$_6$H$_{11}$ | —CH$_2$C$_6$H$_4$-4-CH$_2$OH |
| 33 | —COOCH$_2$CH(CH$_3$)$_2$ | H | —CH$_2$CH(CH$_3$)$_2$ | —C$_6$H$_4$-4-COOH |
| 34 | —COOCH$_3$ | H | —CH$_2$C$_6$H$_5$ | C$_6$H$_2$C$_6$H$_4$-4-COOCH$_3$ |
| 35 | —COOCH$_2$CH(C$_2$H$_5$)(CH$_2$)$_4$H | H | —CH$_3$ | —C$_6$H$_4$-3-CH$_2$OH |
| 36 | —COOCH(CH$_3$)$_2$ | H | —C$_2$H$_5$ | —C$_6$H$_4$-4-CH$_2$CH$_2$OOCCH$_3$ |
| 37 | —COOCH$_2$OOCCH$_3$ | H | —C$_6$H$_5$ | —CH$_2$CH$_2$OOCNHC$_6$H$_5$ |
| 38 | —COOCH$_2$SCH$_2$CH$_2$OH | H | —C$_6$H$_4$-4-CH$_3$ | —CH$_2$CH$_2$CON(C$_2$H$_5$)$_2$ |
| 39 | —COOCH$_2$C$_6$H$_5$ | H | —C$_6$H$_4$-4-OCH$_3$ | —CH$_2$CH$_2$OOCNH(CH$_2$)$_4$H |
| 40 | —COOC$_6$H$_{10}$-4-OCH$_3$ | 3-OC$_2$H$_5$ | —C$_6$H$_4$-3-Cl | —(CH$_2$)$_3$COOC$_2$H$_5$ |
| 41 | —COOCH$_2$CH=CH$_2$ | 3-O(CH$_2$)$_4$H | —C$_6$H$_2$C$_6$H$_4$-2-Cl | —C$_6$H$_4$-4-OCH$_2$CH$_2$OH |
| 42 | —COOCH$_2$NHCOCH$_3$ | 3-O(CH$_2$)$_3$H | —C$_6$H$_4$-4-CN | —C$_6$H$_4$-3-SO$_2$NHCH$_2$CH$_2$OH |
| 43 | —COOCH$_2$NHCOC$_6$H$_5$ | 3-OC(CH$_3$)$_3$ | —C$_6$H$_4$-3-NO$_2$ | —C$_6$H$_4$-3-SO$_2$NHC$_6$H$_4$-4-COOCH$_3$ |
| 44 | —COOCH$_2$SC$_6$H$_5$ | 3-I | —C$_6$H$_4$-4-SO$_2$CH$_3$ | —CH$_2$CH$_2$OOCC$_6$H$_4$-4-OCH$_3$ |
| 45 | —COO(CH$_2$)$_3$SO$_2$CH$_3$ | 2,5-di-Cl | —C$_6$H$_4$-4-NHCOC$_6$H$_5$ | —CH$_2$CH$_2$OOCC$_6$H$_{11}$ |
| 46 | —C$_6$H$_4$-4-COOH | H | —CH$_2$CH$_2$SO$_2$CH=CH$_2$ | —CH$_2$CH$_2$OOCC$_6$H$_5$ |
| 47 | —C$_6$H$_4$-4-COOCH$_3$ | H | —CH$_2$CH$_2$NHCOCH=CH$_2$ |  |
| 48 | $\left[ -C=N\text{-}o\text{-}C_6H_3(5\text{-}COOCH_3)O \right]$ | 3-C$_2$H$_5$ | —CH$_2$CH$_2$OCH$_2$CH$_2$CN | —(CH$_2$)$_3$COOC$_2$H$_5$ |
| 49 | $\left[ -C=N\text{-}o\text{-}C_6H_3(5\text{-}COOH)S \right]$ | -3-(CH$_2$)$_4$H |  | $\left[ -CH_2CH_2OOCC=CHCH-CHS \right]$ |
| 50 | $\left[ -C=N\text{-}o\text{-}C_6H_3(5\text{-}COOC_2H_5)NH \right]$ | H | —CH$_2$CH$_2$SO$_2$CH$_2$CH$_2$NC(O)CH$_2$CO | $\left[ -CH_2CH_2OOCC=CHCH=CHO \right]$ |
| 51 | $\left[ -C=NN=C(COOH)O \right]$ | H | $\left[ -CH_2CH_2SC=N\text{-}o\text{-}C_6H_4O \right]$ | —CH$_2$CH$_2$OOCC$_6$H$_4$-2-CH$_3$ |
| 52 | $\left[ -C=NN=C(C_6H_4\text{-}4\text{-}COOH)S \right]$ | H | $\left[ -CH_2CH_2SO_2CH_2CH_2SC=N\text{-}o\text{-}C_6H_4S \right]$ | —CH$_2$CH$_2$OOCC$_6$H$_4$-3-Cl |
| 53 | $\left[ -C=N\text{-}o\text{-}C_6H_3(5\text{-}COOCH_3)NH \right]$ | H | —CH$_2$CH$_2$NC(O)CH$_2$OCH$_2$CO | —CH$_2$CH$_2$OOCC$_6$H$_4$-3-NO$_2$ |

TABLE II

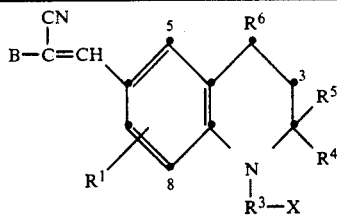

| Example | B | $R^1, R^4, R^5, R^6$ | $R^3-X$ |
|---|---|---|---|
| 54 | —COOCH$_3$ | 2,2,4-tri-CH$_3$ | —CH$_2$CH$_2$OOCCH$_3$ |
| 55 | —COOC$_2$H$_5$ | 2,2,4,7-tetra-CH$_3$ | —CH$_2$CH$_2$OH |
| 56 | —COOCH$_3$ | H | —CH$_2$CH$_2$OOCC$_2$H$_5$ |
| 57 | —COOCH$_2$CH(CH$_3$)$_2$ | H | —CH$_2$C$_6$H$_4$-4-COOH |
| 58 | —COOCH$_2$CH$_2$OCH$_3$ | 2-CH$_3$ | —CH$_2$C$_6$H$_4$-4-COOCH$_3$ |
| 59 | —COOCH$_2$CH$_2$OH | 2,7-di-CH$_3$ | —CH$_2$CH$_2$OH |
| 60 | —COOCH$_2$CH$_2$Cl | 7-CH$_3$ | —(CH$_2$)$_3$OOCCH$_3$ |
| 61 | —COOCH$_2$CH$_2$CN | 7-OCH$_3$ | —CH$_2$C$_6$H$_4$-4-COOH |
| 62 | —COOCH$_2$C$_6$H$_5$ | 7-Cl | —C$_6$H$_{10}$-4-OH |
| 63 | —COOCH$_2$CH$_2$OC$_6$H$_5$ | 7-Br | —C$_6$H$_{10}$-4-COOH |
| 64 | —COOC$_6$H$_{11}$ | 2-CH$_3$ | —CH$_2$CH$_2$OC$_6$H$_4$-4-COOH |
| 65 | —COOC$_6$H$_5$ | 2-CH$_3$ | —(CH$_2$CH$_2$O)$_2$H |
| 66 | —COOCH$_2$C$_6$H$_{11}$ | 2-C$_2$H$_5$ | —CH$_2$C$_6$H$_4$-3-SO$_2$NHCH$_2$CH$_2$OH |
| 67 | —COO(CH$_2$)$_4$OH | 2-(CH$_2$)$_4$H | —CH$_2$C$_6$H$_{10}$-4-CH$_2$OH |
| 68 | —COO(CH$_2$)$_6$OOCCH$_3$ | 2-CH$_3$ | —(CH$_2$)$_4$OOCCH$_3$ |
| 69 | —COOCH$_3$ | 2,5-di-CH$_3$-8-OCH$_3$ | —CH$_2$CH$_2$OOCCH$_3$ |
| 70 | —COOCH$_3$ | 2-CH$_3$-5,8-di-OCH$_3$ | —CH$_2$CH$_2$OH |
| 71 | —COOCH$_3$ | 2,2,4,5-tetra-CH$_3$-8-OCH$_3$ | —CH$_2$CH$_2$OOCOC$_2$H$_5$ |
| 72 | —COOCH$_3$ | 2,2,4-tri-CH$_3$-5,8-di-OC$_2$H$_5$ | —CH$_2$CH$_2$OONHC$_6$H$_5$ |
| 73 | —COOCH$_3$ | 2-CH$_3$-5-Cl-8-OCH$_3$ | —CH$_2$CH$_2$OOCNH$_2$ |
| 74 | —COOC$_2$H$_5$ | 2,2,4-tri-CH$_3$-7-OCH$_3$ | —CH$_2$CH$_2$COCN(CH$_3$)$_2$ |
| 75 | —COOC$_2$H$_5$ | 2,2,4-tri-CH$_3$-7-OC$_2$H$_5$ | —CH$_2$CH$_2$OOCC$_6$H$_5$ |
| 76 | —COOCH(CH$_3$)$_2$ | 2,2,4,8-tetra-CH$_3$-7-Cl | —CH$_2$CH$_2$OOCC$_6$H$_{11}$ |
| 77 | —COOCH$_3$ | 2,2,4,7-tetra-CH$_3$ | —CH$_2$C$_6$H$_4$-4-COOCH$_3$ |
| 78 | —COOCH$_3$ | 7-O(CH$_2$)$_4$H | —CH$_2$CH$_2$COOC$_2$H$_5$ |
| 79 | —COOCH$_3$ | 7-CH$_3$ | —CH$_2$C$_6$H$_4$-4-CH$_2$OH |
| 80 | —COOCH$_3$ | 2-CH$_3$-8-OCH$_3$ | —CH$_2$CH$_2$OOCC=CHCH=CHO |
| 81 | —C=N-o-C$_6$H$_4$(5-COOH)NH | 7-CH$_3$ | —CH$_2$CH$_2$OH |
| 82 | —COOCH$_3$ | 2,2,4-tri-CH$_3$-8-OC$_2$H$_5$ | —CH$_2$CH$_2$OOCC=CHCH=CHS |
| 83 | —C=N-o-C$_6$H$_4$(5-COOCH$_3$)O | 8-OC$_2$H$_5$ | —CH$_2$CH$_2$OH |

TABLE III

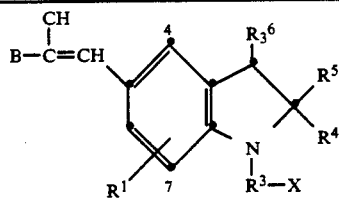

| Example | B | $R^1, R^4, R^5, R^6_3$ | $R^3-X$ |
|---|---|---|---|
| 84 | —COOCH$_3$ | 2-CH$_3$ | —CH$_2$CH$_2$OH |
| 85 | —COOCH$_3$ | H | —CH$_2$CH$_2$OOCCH$_3$ |
| 86 | —COOCH$_3$ | 2,2,3-tri-CH$_3$ | —CH$_2$CH$_2$OOCOCH$_3$ |
| 87 | —COOC$_2$H$_5$ | 2,6-di-CH$_3$ | —CH$_2$CH$_2$OOCC$_6$H$_5$ |
| 88 | —COO(CH$_2$)$_4$H | 2,2,3-tri-CH$_3$-7-OCH$_3$ | —(CH$_2$CH$_2$O)$_2$H |
| 89 | —COOCH$_2$CH$_2$OH | 2,4,7-tri-CH$_3$ | —CH$_2$C$_6$H$_4$-4-COOCH$_3$ |
| 90 | —COOCH$_2$CH$_2$OC$_2$H$_5$ | 2,4-di-CH$_3$-7-OCH$_3$ | —CH$_2$CH$_2$OC$_6$H$_4$-2-COOH |
| 91 | —COOCH$_2$C$_6$H$_5$ | —2-CH$_3$-4,7-di-OC$_2$H$_5$ | —CH$_2$CH$_2$SC$_6$H$_4$-2-COOCH$_3$ |
| 92 | —C=N-o-C$_6$H$_3$(5-COOC$_2$H$_5$)O | 2-CH$_3$ | —(CH$_2$)$_4$OH |

TABLE III-continued

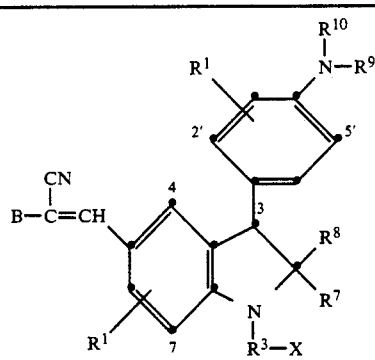

| Example | B | $R^1, R^4, R^5, R^6$ | $R^3-X$ |
|---|---|---|---|
| 93 | $-\overset{\frown}{C}=N\text{-}o\text{-}C_6H_3(5\text{-}COOH)O$ | 2,2,3-tri-$CH_3$ | $-CH_2CH_2SO_2C_6H_4\text{-}3\text{-}COOCH_3$ |
| 94 | $-\overset{\frown}{C}=N\text{-}o\text{-}C_6H_3(5\text{-}COOCH_3)NH$ | 2,2,3-tri-$CH_3$ | $-CH_2CH_2N(SO_2CH_3)CH_2CH_2OH$ |
| 95 | $-\overset{\frown}{C}=N\text{-}o\text{-}C_6H_3(5\text{-}COOCH_3)NCH_3$ | 2,3-di-$CH_3$ | $-CH_2CH_2SO_2NH(CH_2)_4OH$ |
| 96 | $-\overset{\frown}{C}=NN=C(CH_2COOH)S$ | 2-$CH_3$ | $-CH_2CH_2N(SO_2CH_3)CH_2CH_2OH$ |
| 97 | $-\overset{\frown}{C}=NN=C(C_6H_4\text{-}4\text{-}COOH)O$ | 2-$CH_3$ | $-CH_2CH_2CONHCH_2CH_2OH$ |
| 98 | $-\overset{\frown}{C}=N\text{-}o\text{-}C_6H_3(5\text{-}CH_2COOH)O$ | 2-$CH_3$ | $-CH_2C_6H_4\text{-}3\text{-}SO_2NHCH_2CH_2OH$ |

TABLE IV

| Example | B | $R^1$ | $R^3-X$ | $R^7, R^8$ | $R^9$ | $R^{10}$ |
|---|---|---|---|---|---|---|
| 99 | $-COOCH_3$ | H | $-CH_2CH_2OOCCH_3$ | di-$CH_3$ | $-CH_3$ | $-CH_3$ |
| 100 | $-COOCH_3$ | 2,6-di-$CH_3$ | $-CH_2CH_2OH$ | di-$CH_3$ | $-C_2H_5$ | $-C_2H_5$ |
| 101 | $-COOCH_3$ | 2',3',6,7-tetra-$CH_3$ | $-CH_2CH_2OOCOC_2H_5$ | $-CH_3, -C_2H_5$ | $-CH_2C_6H_5$ | $-CH_2C_6H_5$ |
| 102 | $-COOCH_3$ | 3',7-di-$OCH_3$ | $-CH_2C_6H_4\text{-}4\text{-}COOCH_3$ | $-CH_3, -C_6H_5$ | $-CH_2CH_2OC_2H_5$ | $-CH_2CH_2OC_2H_5$ |
| 103 | $-COOCH_3$ | 6-Cl | $-CH_2C_6H_4\text{-}4\text{-}COOH$ | $-CH_3, -C_6H_4\text{-}4\text{-}CH_3$ | $-C_2H_5$ | $-CH_2CH_2CN$ |
| 104 | $-COOCH_3$ | H | $-CH_2CH_2OC_6H_4\text{-}2\text{-}COOH$ | $-CH_3, -C_6H_4\text{-}4\text{-}OCH_3$ | $-C_2H_5$ | $-CH_2CH_2Cl$ |
| 105 | $-COOCH_3$ | H | $-(CH_2CH_2O)_2H$ | $-CH_3, -C_6H_4\text{-}3\text{-}Cl$ | $-C_6H_5$ | $-CH_3$ |
| 106 | $-COOCH_3$ | H | $-CH_2C_6H_4\text{-}3\text{-}SO_2NHC_6H_4\text{-}3\text{-}COOCH_3$ | $-CH_3, -CH(CH_3)_2$ | $-C_6H_{11}$ | $-CH_3$ |
| 107 | $-COOC_2H_5$ | H | $-CH_2CH_2CONH(CH_2)_4OH$ | di-$C_2H_5$ | $-C_6H_4\text{-}2\text{-}CH_3$ | $-C_2H_5$ |
| 108 | $-COO(CH_2)_4H$ | H | $-CH_2CH_2N(SO_2CH_3)CH_2CH_2OH$ | di-$CH_3$ | $-C_6H_4\text{-}3\text{-}OCH_3$ | $-CH_2CH_2C_6H_5$ |
| 109 | $-COOCH_2CH_2OH$ | H | $-CH_2CH_2COOC_2H_5$ | di-$CH_3$ | $-C_6H_4\text{-}4\text{-}Cl$ | $-CH_2C_6H_5$ |

TABLE V

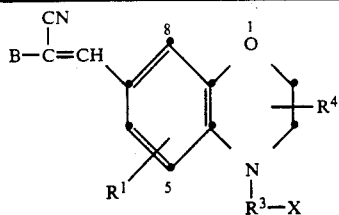

| Example | B | R¹,R⁴ | R³—X |
|---------|---|-------|------|
| 110 | —COOCH₃ | H | —CH₂CH₂OH |
| 111 | —COOCH₃ | 3-CH₃ | —CH₂CH₂OOCCH₃ |
| 112 | —COOC₂H₅ | 3,6-di-CH₃ | —CH₂CH₂OOCC₂H₅ |
| 113 | —COOCH₃ | 6-Cl | —(CH₂CH₂O)₂H |
| 114 | —COOCH₃ | 3,5,8-tri-CH₃ | —CH₂CH₂OOCC₆H₅ |
| 115 | —COO(CH₂)₄H | 2-CH₃-6-OCH₃ | —CH₂C₆H₄-4-COOH |
| 116 | —COOCH₂C₆H₅ | 2,3-di-CH₃ | —CH₂C₆H₄-3-COOH |
| 117 | —COOCH₃ | 3-CH₃ | —CH₂C₆H₄-4-COOCH₃ |
| 118 | —C=N-o-C₆H₃(5-COOH)O | 3-CH₃ | —CH₂CH₂OH |
| 119 | —C=N-o-C₆H₃(5-COOCH₃)O | 3-CH₃ | —CH₂CH₂OC₆H₄-3-COOH |
| 120 | —C=N-o-C₆H₃(5-COOH)NH | 3-CH₃ | —CH₂C₆H₄-3-SO₂NHC₆H₄-4-CH₂CH₂OH |
| 121 | —C=NN=C(COOCH₃)O | 3-CH₃ | —CH₂CH₂SO₂C₆H₄-3-SO₂NHC₆H₄-3-CH₂OH |
| 122 | —C=NC(CH₃)=C(COOCH₃)S | 3-CH₃ | —CH₂CH₂SC₆H₄-4-SO₂NH(CH₂)₄OH |

TABLE VI

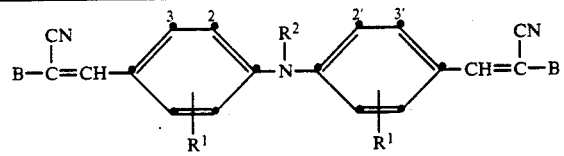

| Example | B | R¹ | R² |
|---------|---|----|----|
| 123 | —COOCH₃ | H | —C₂H₅ |
| 124 | —COOCH₃ | 3-CH₃ | —CH₃ |
| 125 | —COOC₂H₅ | 3-OCH₃ | —CH₂C₆H₅ |
| 126 | —COOCH₂CH₂OH | 3-Cl-3'-CH₃ | —C₆H₄-4-Cl |
| 127 | —COOCH₂CH₂CN | 2,5,3'-tri-OCH₃ | —C₆H₁₁ |
| 128 | —COOCH₂CH₂OOCCH₃ | 3,3'-di-CH₃ | —CH₂C₆H₁₁ |
| 129 | —COOCH₂CH₂Cl | 2-C₂H₅ | —CH₂CH₂SC=NNHCH=N |
| 130 | —COOCH₂C₆H₅ | H | —CH₂CH₂NC(O)CH₂CH₂CO |
| 131 | —COOCH₂C₆H₁₁ | H | —CH₂CH₂NC(O)CH₂SCO |
| 132 | —COOCH₂CH₂OC₆H₅ | H | —CH₂CH₂SO₂CH₂CH₂SC=NN(CH₃)CH=N |
| 133 | —COOCH₂CH₂SCH₂CH₂OH | H | —CH₂CH₂SC₆H₅ |
| 134 | —COOCH₂CH₂NHCOCH₃ | H | —CH₂CH₂SC₆H₁₁ |
| 135 | —C=NN=C(COOCH₃)O | H | —CH₂CH₂NC(O)NHCH₂CH₂CO |

TABLE VI-continued

[Structure: B—C(CN)=CH—C₆H₃(R¹)—N(R²)—C₆H₃(R¹)—CH=C(CN)—B, with positions 3,2 and 2',3' labeled]

| Example | B | R¹ | R² |
|---------|---|-----|-----|
| 136 | —C=NC(C₆H₄-4-COOCH₃)=CHS | H | —CH₂CH₂NC(O)NHC(C₆H₅)₂CO |
| 137 | H, —C=N-o-C₆H₃(6-OCH₂CH₂OH)S | H | —CH₂CH₂NC(O)CH₂OCO |

TABLE VII $$\text{B—C=CH} - \underset{\underset{R^1}{|}}{C_6H_3(3)} - \underset{\underset{R^2}{|}}{N} - R^3 - \underset{\underset{R^{2'}}{|}}{N} - \underset{\underset{R^{1'}}{|}}{C_6H_3(3')} - CH=C-B$$
(with CN on each =C)

| Example | B | R¹ | R² | R²' | R³ |
|---|---|---|---|---|---|
| 138 | —COOCH₃ | H | —C₂H₅ | —C₂H₅ | —CH₂CH₂— |
| 139 | —COOCH₃ | 3,3'-di-CH₃ | —CH₃ | —CH₃ | —CH₂CH₂OCH₂CH₂— |
| 140 | —COOCH₃ | 3,3'-di-OCH₃ | —C₆H₁₁ | —C₆H₁₁ | —CH₂CH₂OOCCH₂CH₂COOCH₂CH₂— |
| 141 | —COOC₂H₅ | 3-CH₃ | —CH₃ | —CH₃ | —CH₂CH₂OOCCH₂CH₂— |
| 142 | —COOCH(CH₃)₂ | 2,2',5,5'-tetra-OCH₃ | —C₂H₅ | —C₂H₅ | —CH₂C₆H₁₀-4-CH₂— |
| 143 | —COOC(CH₃)₃ | 3,3'-di-CH₃ | —CH₂CH₂OC₂H₅ | —CH₂CH₂OC₂H₅ | —CH₂C₆H₄-4-CH₂— |
| 144 | —COOCH₂CH₂OH | 3-CH₃ | —CH₂C₆H₅ | —C₆H₁₁ | —CH₂CH₂N(SO₂CH₃)CH₂CH₂— |
| 145 | —COOCH₂CH₂OCH₃ | 3,3'-di-CH₃ | —C₂H₅ | —C₂H₅ | —CH₂CH₂OC₆H₄-4-OCH₂CH₂— |
| 146 | —COOCH₂CH₂CN | 3,3'-di-CH₃ | —CH₂C₆H₁₁ | —CH₂C₆H₁₁ | —CH₂CH₂OOCOCH₂CH₂— |
| 147 | —COOCH₂CH₂Cl | H | —CH₂CH₂Cl | —CH₂CH₂Cl | —CH₂CH₂S—CH₂CH₂— |
| 148 | —COOCH₂C₆H₅ | H | —CH₂CH₂OC₆H₅ | —CH₂CH₂OC₆H₅ | —CH₂CH₂N(CH₃)CH₂CH₂— |
| 149 | —COOCH₂C₆H₁₁ | H | —CH₂CH₂CN | —CH₂CH₂CN | —CH₂CH₂OOCNH(CH₂)₆NHCOOCH₂CH₂— |
| 150 | —COOCH₂CH=CH₂ | H | —(CH₂)₃SO₂CH₃ | —(CH₂)₃SO₂CH₃ | —CH₂CH₂OOCNHC₆H₄-3-NHCOOCH₂CH₂— |
| 151 | —COOCH₃ | H | —CH₂CH=CH₂ | —CH₂CH=CH₂ | —CH₂CH₂OOCC₆H₄-4-COOCH₂CH₂— |
| 152 | [—C=N-o-C₆H₃(5-COOCH₃)O] | H | —C₆H₅ | —CH₃ | —CH₂CH₂N(SO₂C₆H₅)CH₂CH₂— |
| 153 | [—C=N-o-C₆H₃(5-COOH)O] | H | —C₂H₅ | —C₂H₅ | —CH₂CH₂SO₂CH₂CH₂ |
| 154 | [—C=N-o-C₆H₃(5-COOCH₃)S] | 3,3'-di-CH₃ | —(CH₂)₄H | —(CH₂)₄H | -1,4-C₆H₄— |

TABLE VIII

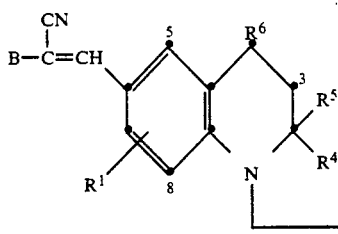 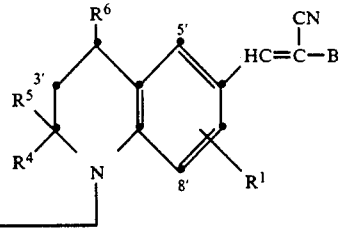

| Example | B | $R^1, R^4, R^5, R^6$ | $R^3$ |
|---|---|---|---|
| 155 | —COOCH$_3$ | H | —(CH$_2$)$_4$— |
| 156 | —COOCH$_3$ | 2,2'-di-CH$_3$ | —CH$_2$CH$_2$OOC(CH$_2$)$_4$COOCH$_2$CH$_2$— |
| 157 | —COOCH$_3$ | 7,7'-di-CH$_3$ | —CH$_2$CH$_2$SO$_2$CH$_2$CH$_2$ |
| 158 | —COOCH$_3$ | 7,7'-di-OCH$_3$ | —CH$_2$C$_6$H$_4$-4-CH$_2$— |
| 159 | —COOC$_2$H$_5$ | 2,2,2',2',4,4'-hexa-CH$_3$ | —CH$_2$CH$_2$OOCCH$_2$CH$_2$COOCH$_2$CH$_2$— |
| 160 | —COOCH$_2$CH(CH$_3$)$_2$ | 2,2,2',2',4,4'-hexa-CH$_3$ | —CH$_2$CH$_2$SCH$_2$CH$_2$— |
| 161 | —COOCH$_3$ | 2,2,2',2',4,4',7,7'-octa-CH$_3$ | —CH$_2$C$_6$H$_{10}$-4-CH$_2$— |
| 162 | —COOCH$_3$ | 2,2',7,7'-tetra-CH$_3$ | —CH$_2$CH$_2$SO$_2$CH$_2$CH$_2$— |
| 163 | —COOC$_6$H$_5$ | 7,7'-di-Cl | —CH$_2$CH$_2$OC$_6$H$_4$-4-OCH$_2$CH$_2$— |
| 164 | —COOCH$_3$ | 5,5'-di-CH$_3$-8,8'-di-OCH$_3$ | —CH$_2$CH$_2$N(SO$_2$CH$_3$)CH$_2$CH$_2$— |
| 165 | —COOCH$_3$ | 2,2',7,7'-tetra-CH$_3$ | —CH$_2$CH$_2$OOCC$_6$H$_4$-3-COOCH$_2$CH$_2$— |
| 166 | —COOCH$_3$ | H | —CH$_2$CH$_2$OOCNC$_6$H$_3$-4-CH$_3$-3-NHCOOCH$_2$CH$_2$— |
| 167 | —C=N-o-C$_6$H$_3$(5-CH$_2$OH)S | 2,2'-di-CH$_3$ | —CH$_2$CH$_2$OOCC$_6$H$_{10}$-4-COOCH$_2$CH$_2$— |
| 168 | —C=N-o-C$_6$H$_4$NCH$_2$CH$_2$OH | 2,2'-di-CH$_3$ | —CH$_2$CH$_2$SO$_2$N(CH$_3$)CH$_2$CH$_2$— |
| 169 | —C=N-o-C$_6$H$_3$(5-COOCH$_3$)O | 2,2',7,7'-tetra-CH$_3$ | —CH$_2$CH$_2$N(SO$_2$C$_6$H$_5$)CH$_2$CH$_2$— |

The color concentrates of the present invention comprise crystalline, semi-crystalline and amorphous polyesters having copolymerized therein at least 1.0, normally at least 5.0, weight percent of the residues of at least one methine colorant compound of formula (I). The concentration of the methine colorant residue in the polyester is dependent on such factors as the end use for which a particular concentrate is designed, the polyester being used and the physical characteristics required of the color concentrate. Normally, the color concentrates will not contain more than 55 weight percent of methine colorant residues with a concentration in the range of about 10 to 40 weight percent being more common. Typically, the polyester color concentrates have an inherent viscosity of at least 0.20 and are comprised of (i) a diacid component consisting of the residues of one or more dicarboxylic acids, (ii) a diol component consisting of the residues of one or more diols and (iii) a colorant component consisting of the residues of one or more methine compounds of formula (I). The concentration of colorant component (iii) and inherent viscosity are interrelated to the extent that the degree of polymerization and the inherent viscosity should be sufficiently high to ensure that substantially all of the colorant compound is reacted into the polymer and, preferably, into polymer chains which are not extractable. Thus, for example, when the concentration of colorant component (iii) is 20 weight percent or higher, the inherent viscosity of the polyester normally will be about 0.25 or higher.

The diacid residues may be derived from aliphatic, alicyclic, or aromatic dicarboxylic acids such as terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid and the like. In the polymer preparation, it is often preferable to derive the diacid residues from an ester-forming derivative of the dicarboxylic acid such as the dimethyl, diethyl, or dipropyl esters. The anhydrides or acid halides of these acids also may be employed where practical.

The diol components of the described polyesters may be selected from ethylene glycol, 1,2-propanediol, 1,3-propanediol, 2-methyl 1,3-propanediol, 1,4-butanediol, 2,2-dimethyl- 1,3-propanediol, 1,6-hexanediol, 1,10-decanediol, 1,12-dodecanediol, 1,2-cyclohexanediol, 1,4-cyclohexanediol, 1,2-cyclohexanedimethanol, 1,3-cyclohexanedimethanol, 1,4-cyclohexanedimethanol, X,8-bis(hydroxymethyl)-tricyclo-[5.2.1.0]-decane wherein X represents 3, 4, or 5; and diols containing one or more oxygen atoms in the chain, e.g., diethylene glycol, triethylene glycol, dipropylene glycol, tripropylene glycol, 1,3- and 1,4-bis(2-hydroxyethyl)benzene and the like. In general, these diols contain 2 to 18, preferably 2 to 12 carbon atoms. Cycloaliphatic diols can be employed in their cis or trans configuration or as mixtures of both forms.

The amorphous color concentrates of our invention exhibit a glass transition temperature (Tg) and no, or only a trace of, crystallization or melting point by differential scanning calorimetry (DSC). Examples of such amorphous polyesters include those obtained by the polymerization of a methine colorant compound of formula (I), terephthalic and/or 2,6-naphthalenedicarboxylic acid and a branched-chain diol having the formula

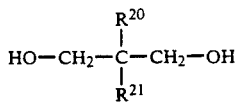

wherein $R^{20}$ is hydrogen or an unsubstituted or substituted alkyl, cycloalkyl or aryl radical, e.g., the radicals which $R^2$ may represent, and $R^{21}$ is an unsubstituted or substituted alkyl, cycloalkyl or aryl radical. Preferred amorphous polyester color concentrates have an inherent viscosity of about 0.2 to 0.8 and are comprised of:

(i) diacid residues comprised of at least 50, preferably at least 80, mole percent terephthalic and/or 2,6-naphthalenedicarboxylic acid residues;

(ii) diol residues comprised of at least 50, preferably at least 80, mole percent of residues of a diol having the formula

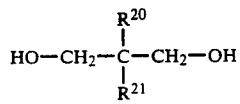

wherein $R^{20}$ is hydrogen or lower alkyl and $R^{21}$ is lower alkyl; and (iii) residues of methine colorant compound (I). The particularly preferred amorphous polyester color concentrates are comprised of (i) diacid residues consisting essentially of terephthalic and/or 2,6-naphthalenedicarboxylic acid residues; (ii) diol residues consisting essentially of 2,2-dimethyl-1,3-propanediol residues; and (iii) residues of one or more methine colorant compound (I), especially a methine compound of formula (II), (III), (IV) or (V).

Other amorphous polyesters, as defined above, suitable for preparing the colored semicrystalline powders may be obtained by employing (1) two dicarboxylic acids and one or more diols or (2) two diols and one or more dicarboxylic acids according to known procedures for obtaining amorphous polyesters. The polyester comprising a diacid component consisting of 75 mole percent terephthalic acid residues and 25 mole percent 1,4-cyclohexanedicarboxylic acid residues, a diol component consisting of 1,4-butanediol residues and residues of methine compound (I) is an example of such a polyester.

The partially-crystalline color concentrates of this invention usually exhibit a glass transition temperature, a crystallization temperature and a melting temperature by DSC. These partially-crystalline, polyester concentrates are comprised of (i) diacid residues consisting of at least 80 mole percent terephthalic acid residues, 2,6-naphthalenedicarboxylic acid residues, 1,3-cyclohexanedicarboxylic acid residues, 1,4-cyclohexanedicarboxylic acid residues or a mixture thereof, (ii) diol residues consisting of at least 50 mole percent of residues having the formula $-O-(CH_2)_p-O-$ wherein p is 2, preferably 4, to 12 and (iii) residues of colorant compound (I). A preferred partially-crystalline color concentrate has a melting temperature of at least 110° C. and is comprised of (i) diacid residues comprised of at least 80 mole percent terephthalic acid residues, (ii) diol residues comprised of at least 80 mole percent of residues of 1,4-butanediol and (iii) residues of colorant compound (I). An especially preferred partially-crystalline color concentrate has a melting temperature of at least 110° C. and consists essentially of (i) terephthalic acid residues, (ii) 1,4-butanediol residues and (iii) residues of one of the colorant compounds of formula (II), (III), (IV) or (V).

The colored semicrystalline powders provided by our invention may be obtained by means of a dissolution-crystallization-precipitation procedure wherein the amorphous or partially-crystalline polyester color concentrates described above are dissolved in an organic solvent from which the polymeric color concentrate is recovered in a finely divided form consisting of particles of relatively uniform size, e.g., from about 10 to 30 microns. If desired, the particle size of the colored semicrystalline powders may be reduced further by conventional grinding processes. Examples of solvents in which the amorphous and/or partially-crystalline concentrates may be dissolved include halogenated hydrocarbons such as aliphatic chlorides, e.g., methylene chloride, esters such as alkyl esters of carboxylic acids, e.g., ethyl acetate and methyl benzoate, hydrocarbons such as toluene and ethers such as tetrahydrofuran. We have found methylene chloride to be a particularly effective solvent.

The particular dissolution-crystallization-precipitation procedure utilized is not critical. The amorphous or partially-crystalline concentrate may be dissolved in a suitable solvent at elevated temperatures and then crystallized in a finely-divided state by cooling, with or without a reduction in the volume of solvent, i.e., either with or without a solution concentration step. Another useful technique involves dissolving the amorphous concentrate in an organic solvent, either at ambient or elevated temperature, and then adding to the solution another miscible solvent which causes crystallization of the colored semicrystalline powder. The use of methylene chloride as the primary solvent and an alkyl acetate such as ethyl acetate as the "crystallization-inducing" solvent has been found to be particularly efficacious. Depending on their intended utility, the colored semicrystalline powders may be extracted with a suitable organic solvent to remove relatively low molecular weight polyester oligomers. Examples of oligomer-extracting solvents include ketones such as acetone, 2-pentanone, 3-methyl-2-butanone, 4-methyl-2-pentanone, 2-hexanone and 5-methyl-2-hexanone; hydrocarbons such as hexane, heptane and toluene; and ethers such as tetrahydrofuran. Another, but not preferred, dissolution-precipitation procedure involves dissolving the amorphous color concentrates in certain solvents, e.g., ethyl acetate, from which the polymeric color concentrate, after undergoing a change in morphology, precipitates.

Some of the more crystalline polyesters such as poly(ethylene terephthalate) and poly(tetramethylene terephthalate) require the use of a high-boiling solvent in the dissolution-precipitation procedure. Examples of such high-boiling solvents include alkyl esters of aromatic carboxylic acids, e.g. alkyl benzoates, aromatic ketones, e.g., acetophenone, and aromatic oxides, e.g. diphenyl oxide. Methyl benzoate is a particularly preferred high-boiling solvent since it is readily available, has a pleasant odor and does not cause color problems during crystallization which sometimes is a problem with acetophenone.

In one variation of the process, crude polyester color concentrate is prepared and granulated to a very course powder which is heated with a high-boiling solvent (methyl benzoate) to facilitate solution. Upon cooling, crystallization-precipitation occurs and a diluent such as acetone usually is needed to permit stirring. Filtration gives the finely-divided powder which may require washing or reslurrying to remove the crystallization solvent.

In another variation of the dissolution-crystallization-precipitation process, crystallization can occur as an integral part of the polyester color concentrate manufacturing process wherein the crystallization solvent is added to a melt of the concentrate to obtain a solution of the color concentrate which then may be obtained as a powder by precipitation. The polyester color concentrate powder is thus obtained in a purified form without the need of granulating by a means which may be used in conjunction with batch processing.

The dissolution-crystallization-precipitation procedure alters the morphology of the amorphous and partially-crystalline polyester color concentrates in a number of respects. X-Ray diffraction analysis of the colored semicrystalline powders shows a marked increase in the crystallinity of the polyester and, while the amorphous polyester concentrates do not exhibit a melting temperature, the microcrystalline concentrates usually (almost always) exhibit a melting temperature by DSC. Although the weight average molecular weight (Mw) may increase, decrease or not be changed by the dissolution-crystallization-precipitation procedure, the number average molecular weight (Mn) always increases, the magnitude of the increase depending on the degree to which oligomeric material has been removed from the colored semicrystalline polyester powder. The polydispersity ratio (Mw:Mn) of the colored semicrystalline polyester is always less than that of the polyester concentrate from which it is prepared due to the increase in Mn (even when Mw increases, Mn increases more). Finally, the inherent viscosity of the colored semicrystalline powders normally is slightly higher than that of the color concentrate.

The amorphous and partially-crystalline polyester color concentrates may be used in coloring various thermoplastic polymeric materials when non-extractability or non-volatility of the colorant is critical because of toxicity considerations, e.g., in rigid and flexible packaging materials for food. The concentrates and powders may be used in formulating inks, coatings, toners for impactless printing, and similar products.

The polyester color concentrates may be prepared according to conventional esterification or transesterification and melt polycondensation procedures using (i) a dicarboxylic acid or, preferably, a lower alkyl ester thereof, (ii) a diol and (iii) a methine colorant compound bearing two reactive groups. Normally, at a 50 mole percent excess of the diol is used. The methine colorant compound preferably is added with the other monomers at the commencement of the color concentrate manufacture although it may be added subsequently, e.g., at the beginning or during the polycondensation step. The concentration (weight percent) of the colorant residue is determined by summing up the weights of all the components charged to the reactor and subtracting the sum of the weights of the components removed during transesterification and polycondensation, e.g., methanol and excess diol. The difference represents the theoretical yield of the color concentrate. The weight of the methine colorant charged to the reactor is divided by the theoretical weight and multiplied by 100 to give the weight percent of colorant residue.

Our novel color concentrates and their preparation are further illustrated by the following examples. The inherent viscosities specified herein are determined at 25° C. using 0.5 g of polymer (polyester color concentrate) per 100 mL of a solvent consisting of 60 weight percent phenol and 40 weight percent tetrachloroethane. The weight average molecular weight (Mw) and number average molecular weight values referred to herein are determined by gel permeation chromatography. The melting temperatures are determined by differential scanning calorimetry on the first and/or second heating cycle at a scanning rate of 20° C. per minute and are reported as the peaks of the transitions.

EXAMPLE 170

The following materials are placed in a 500-mL three-necked, round-bottom flask:

| | |
|---|---|
| 155.2 g | (0.80 mol) dimethyl terephthalate |
| 99.2 g | (1.60 mol) ethylene glycol |
| 0.0175 g | Ti from a n-butanol solution of titanium tetraisopropoxide |
| 18.0 g | (0.545 mol) methyl 3-[4-[[2-(acetyloxy)-ethyl]ethylamino]-2-methylphenyl]-2-cyano-2-propenoate (from Example 1) |

The flask is equipped with a nitrogen inlet, stirrer, vacuum outlet, and condensing flask. The flask and contents are heated in a Belmont metal bath with a nitrogen sweep over the reaction mixture as the temperature is increased to 200° C. and then to 220° C. over 75 minutes. Over the next 30 minutes the temperature is increased to about 240° C. and then to about 260° C. over the next 30 minutes. The temperature is quickly raised (over about 10 minutes) to 275° C. and a vacuum is applied until the pressure is reduced to 0.5 mm Hg. The polycondensation is completed by heating the flask and contents at about 275° C. for about 45 to 60 minutes under a pressure of 0.1 to 0.5 mm Hg. The flask is removed from the metal bath and is allowed to cool while the polymer solidifies. The resulting dark yellow polyester, containing 10.3 weight percent of the methine colorant residue, has an inherent viscosity of 0.52, a melting temperature (Tm) of 237° C., a weight average molecular weight of 44,379, a number average molecular weight of 20,843 and a polydispersity value of 2.13.

EXAMPLE 171

The procedure described in Example 170 is repeated using the following materials:

| | |
|---|---|
| 119.3 g | (0.615 mol) dimethyl terephthalate |
| 85.5 g | (1.39 mol) ethylene glycol |
| 0.0156 g | Ti from a n-butanol solution of titanium tetraisopropoxide |
| 52.0 g | (0.158 mol) methyl 3-[4-[[2-(acetyloxy)-ethyl]ethylamino]-2-methylphenyl]-2-cyano-2-propenoate (from Example 1) |

The dark yellow polyester obtained contains 33.4 weight percent of the methine colorant residue, has an inherent viscosity of 0.54, a weight average molecular weight of 68,105, a number average molecular weight of 17,174 and a polydispersity value of 3.97.

EXAMPLE 172

The following materials are placed in a 500-mL three-necked, round-bottom flask:

| | |
|---|---|
| 125.1 g | (0.645 mol) dimethyl terephthalate |
| 94.6 g | (0.91 mol) 2,2-dimethyl-1,3-propanediol |
| 0.01864 g | Ti from a n-butanol solution of titanium tetraisopropoxide |
| 36.3 g | (0.11 mol) methyl 3-[4-[[2-(acetyloxy)-ethyl]ethylamino]-2-methylphenyl]-2-cyano-2-propenoate (from Example 1) |

The flask is equipped with a nitrogen inlet, stirrer, vacuum outlet, and condensing flask. The flask and contents are heated in a Belmont metal bath with a nitrogen sweep over the reaction mixture as the temperature is increased to 200° C. and then to 220° C. over 90 minutes. Over the next 30 minutes the temperature is increased to about 240° C. and then to about 260° C. over the next 30 minutes. The temperature is quickly raised (over about 10 minutes) to 275° C. with a stream of nitrogen bleeding into the system and a vacuum is applied until the pressure is reduced to 0.5 mm Hg. The polycondensation is completed by heating the flask and contents at about 275° C. for about 1.25 hours under a pressure of 0.1 to 0.5 mm Hg. The flask is removed from the metal bath and is allowed to cool while the polymer solidifies. The resulting high molecular weight yellow polyester, containing 19.76 weight percent of the methine colorant residue, has an inherent viscosity of 0.30, no melting temperature, a weight average molecular weight of 21,691, a number average molecular weight of 13,366 and a polydispersity value of 1.63.

EXAMPLE 173

The procedure described in Example 170 is repeated using the following materials:

| | |
|---|---|
| 97.0 g | (0.50 mol) dimethyl terephthalate |
| 62.0 g | (1.0 mol) ethylene glycol |
| 0.0120 g | Ti from a n-butanol solution of titanium tetraisopropoxide |
| 36.0 g | (0.109 mol) methyl 3-[4-[[2-(acetyloxy)-ethyl]ethylamino]-2-methylphenyl]-2-cyano-2-propenoate (from Example 1) |

Upon completion of polycondensation, the vacuum is relieved with nitrogen and methyl benzoate (160 mL) is added slowly. The mixture is stirred to solution over about 10 minutes with the flask still in the metal bath. The heat is then removed and stirring continued. Crystallization begins to occur at about 115° C. At 50° C., acetone (150 mL) is added to facilitate stirring. The diluted slurry is stirred for about 30 minutes, filtered and the cake washed three times with acetone and dried. The resulting dark yellow polyester contains 29.9 weight percent of the methine colorant residue, has an inherent viscosity of 0.29, a weight average molecular weight of 30,518, a number average molecular weight of 16,889 and a polydispersity value of 1.80. The weight of polyester color concentrate powder recovered is 104.7 g, 86.9% of theory.

EXAMPLE 174

The procedure described in Example 173 is repeated except that upon completion of the polycondensation, the vacuum is relieved with nitrogen and diphenyl oxide (200 mL) is added dropwise and the mixture is stirred to solution. Heating is discontinued and crystallization begins to occur at about 130° C. At about 100° C., acetone (100 mL) is added to facilitate stirring. The diluted slurry is filtered and the cake washed well with acetone and dried in air (yield - 100.5 g). The resulting dark yellow polyester contains 29.9 weight percent of the methine colorant residue, has an inherent viscosity of 0.67, a melting temperature of 176° C., a glass transition temperature of 80° C., a weight average molecular weight of 46,040, a number average molecular weight of 22,502 and a polydispersity value of 2.05.

EXAMPLE 175

The following materials are placed in a 500-mL three-necked, round-bottom flask:

| | |
|---|---|
| 97.0 g | (0.50 mol) dimethyl terephthalate |
| 67.5 g | (0.75 mol) 1,4-butanediol |
| 0.0142 g | Ti from a n-butanol solution of titanium tetraisopropoxide |
| 45.0 g | (0.545 mol) methyl 3-[4-[[2-(acetyloxy)-ethyl]ethylamino]-2-methylphenyl]-2-cyano-2-propenoate (from Example 1) |

The flask is equipped with a nitrogen inlet, stirrer, vacuum outlet, and condensing flask. The flask and contents are heated in a Belmont metal bath with a nitrogen sweep over the reaction mixture as the temperature is increased to 200° C. and then to 220° C. over 2 hours. Over the next 30 minutes the temperature is increased to about 240° C. and then to about 260° C. over the next 30 minutes. The temperature is quickly raised (over about 10 minutes) to 275° C. and a vacuum is applied until the pressure is reduced to 0.5 mm Hg. The polycondensation is completed by heating the flask and contents at about 275° C. for about 45 minutes under a pressure of 0.1 to 0.5 mm Hg. The flask is removed from the metal bath and is allowed to cool while the polymer solidifies. The resulting dark yellow polyester, containing 31.5 weight percent of the methine colorant residue, has an inherent viscosity of 0.49, a weight average molecular weight of 28,909, a number average molecular weight of 15,431, a polydispersity value of 1.87 and a melting temperature of 185° C.

EXAMPLE 176

The procedure described in Example 175 is repeated except that upon completion of the polycondensation, the vacuum is relieved with nitrogen and methyl benzoate (125 mL) is added slowly and the mixture is stirred to solution with the flask still in the metal bath. The resulting solution is transferred to a 2L beaker and stirred until crystallization occurs. Acetone (500 mL) is added slowly with stirring to dilute the slurry and keep it stirrable. The diluted slurry is stirred for 30 minutes, filtered and the cake washed with acetone. The cake is twice reslurried in acetone and the dried in air. The resulting dark yellow semicrystalline-polyester powder contains 31.5 weight percent of the methine colorant residue, has an inherent viscosity of 0.359, a melting temperature of 185° C., a weight average molecular weight of 29,385, a number average molecular weight of 17,655 and a polydispersity value of 1.66. The weight of the powder recovered is 129.4 g, 90.8% of theory.

EXAMPLE 177

The following materials are placed in a 500-mL three-necked, round-bottom flask:

| | |
|---|---|
| 155.2 g | (0.80 mol) dimethyl terephthalate |
| 108.0 g | (0.75 mol) 1,4-butanediol |

-continued

| | |
|---|---|
| 0.0226 g | Ti from a n-butanol solution of titanium tetraisopropoxide |
| 70.0 g | (0.212 mol) methyl 3-[4-[[2-(acetyloxy)-ethyl]ethylamino]-2-methylphenyl]-2-cyano-2-propenoate (from Example 1) |

The flask is equipped with a nitrogen inlet, stirrer, vacuum outlet, and condensing flask. The flask and contents are heated in a Belmont metal bath with a nitrogen sweep over the reaction mixture as the temperature is increased to 200° C. and then to 220° C. over 2 hours. Over the next 90 minutes the temperature is increased to about 230° C. and a vacuum is applied until the pressure is reduced to 0.5 mm Hg. The polycondensation is completed by heating the flask and contents at about 230° C. for about 8 hours under a pressure of 0.1 to 0.5 mm Hg. The vacuum is relieved with nitrogen and methyl benzoate (200 mL) is added slowly and the mixture is stirred to solution over about 10 minutes with the flask still in the metal bath. The resulting solution is transferred to a 2L beaker and stirred until crystallization occurs. Hexane (800 mL) is added slowly with stirring to dilute the slurry and keep it stirrable. The diluted slurry is stirred for 30 minutes, filtered and the cake is washed with acetone. The cake is twice reslurried in acetone and the dried in air. The resulting dark yellow semicrystalline polyester powder contains 30.87 weight percent of the methine colorant residue, has an inherent viscosity of 0.550, a melting temperature of 179° C., a weight average molecular weight of 33,707, a number average molecular weight of 19,956 and a polydispersity value of 1.69. The weight of the powder recovered is 213.4 g.

EXAMPLE 178

The procedure described in Example 172 is repeated using the following materials:

| | |
|---|---|
| 126.5 g | (0.652 mol) dimethyl terephthalate |
| 94.6 g | (0.91 mol) 2,2-dimethyl-1,3-propanediol |
| 0.01864 g | Ti from a n-butanol solution of titanium tetraisopropoxide |
| 37.0 g | (0.096 mol) methyl 3-[1-[2-(acetyloxy)ethyl]-1,2,3,4-tetrahydro-2,2,4,7-tetramethyl-6-quinolyl]2-cyano-2-propenoate (from Example 2) |

The resulting dark yellow polyester contains 19.8 weight percent of the methine colorant residue, has an inherent viscosity of 0.38, no melting temperature, a weight average molecular weight of 27,625, a number average molecular weight of 13,770 and a polydispersity value of 1.78.

EXAMPLE 179

The procedure described in Example 172 is repeated using the following materials:

| | |
|---|---|
| 106.7 g | (0.549 mol) dimethyl terephthalate |
| 81.2 g | (0.78 mol) 2,2-dimethyl-1,3-propanediol |
| 0.0165 g | Ti from a n-butanol solution of titanium tetraisopropoxide |
| 34.3 g | (0.050 mol) bis[2-[[4(2-cyano-3-methoxy-3-oxy-1-propenyl)3-methyl-phenyl]ethyl-amino]ethyl]hexanedioate (from Example 3) |

The dark yellow polyester obtained has an inherent viscosity of 0.55, no melting temperature, a weight average molecular weight of 40,515, a number average molecular weight of 17,991 and a polydispersity value of 2.25.

EXAMPLE 180

The procedure described in Example 172 is repeated using the following materials:

| | |
|---|---|
| 106.25 g | (0.548 mol) dimethyl terephthalate |
| 81.76 g | (0.786 mol) 2,2-dimethyl-1,3-propanediol |
| 0.0165 g | Ti from a n-butanol solution of titanium tetraisopropoxide |
| 34.56 g | (0.057 mol) methine colorant of Example 4 |

The dark yellow polyester color concentrate obtained has an inherent viscosity of 0.25, no melting temperature, a weight average molecular weight of 17,935, a number average molecular weight of 8,922 and a polydispersity value of 2.0.

EXAMPLE 181

The procedure described in Example 172 is repeated using the following materials:

| | |
|---|---|
| 127.8 g | (0.659 mol) dimethyl terephthalate |
| 94.64 g | (0.91 mol) 2,2-dimethyl-1,3-propanediol |
| 0.0183 g | Ti from a n-butanol solution of titanium tetraisopropoxide |
| 37.0 g | (0.083 mol) methyl 2-[2-cyano-[4-[[2-acetyloxyethyl)ethyl]amino]-2-methylphenyl]ethylidene]-5-benzoxazole carboxylate (from Example 5) |

The dark yellow polyester color concentrate obtained has an inherent viscosity of 0.50 and no melting temperature.

EXAMPLE 182

The procedure described in Example 172 is repeated using the following materials:

| | |
|---|---|
| 90.62 g | (0.467 mol) dimethyl terephthalate |
| 77.83 g | (0.748 mol) 2,2-dimethyl-1,3-propanediol |
| 0.0161 g | Ti from a n-butanol solution of titanium tetraisopropoxide |
| 47.4 g | (0.108 mol) methine colorant of Example 34 |

The resulting color concentrate contains 29.4 weight percent of colorant residue, has an inherent viscosity of 0.53, no melting temperature, a weight average molecular weight of 33,120, a number average molecular weight of 15,830 and a polydispersity value of 2.09

EXAMPLE 183

The procedure described in Example 172 is repeated using the following materials:

| | |
|---|---|
| 75.97 g | (0.392 mol) dimethyl terephthalate |
| 66.41 g | (0.639 mol) 2,2-dimethyl-1,3-propanediol |
| 0.0135 g | Ti from a n-butanol solution of titanium tetraisopropoxide |
| 39.96 g | (0.0996 mol) dimethyl 3,3'-[(methylimino)-di-4,1-phenylene]bis[2-cyano-2-propenoate] (from Example 6) |

The resulting color concentrate contains 29.5 weight percent of colorant residue, has an inherent viscosity of 0.636, no melting temperature, a weight average molecular weight of 71,052, a number average molecular weight of 18,019 and a polydispersity value of 3.94

EXAMPLE 184

A portion (25.0 g) of the amorphous polyester color concentrate prepared in Example 172 is granulated using a Wiley mill and dissolved in methylene chloride (200 mL) at about 25° C. with stirring. Ethyl acetate (200 mL) is added and the methylene chloride is removed by distillation. The mixture is stirred for about 12 to 15 hours (usually overnight) at about 25° C. during which time the colored semicrystalline powder separates. The solid is collected by filtration and reslurried in acetone (200 mL each time) and filtered four times to remove oligomers from the product which after drying weighs 20.0 g. The colored semicrystalline powder thus prepared has an inherent viscosity of 0.35, a melting temperature of 134° C., a weight average molecular weight of 23,793, a number average molecular weight of 17,323 and a polydispersity value of 1.37. The total accountability of the methine colorant compound is 93% as determined by visual spectroscopy and a comparison of the absorbance of a methylene chloride solution of the starting methine colorant reactant with the absorbance of a methylene chloride solution of the color concentrate. The comparison shows no shift in absorbance indicating that the colorant is not decomposed during the synthesis of the polyester.

EXAMPLE 185

The procedure of Example 184 is repeated using 25.0 g of the amorphous color concentrate of Example 178 to obtain an essentially theoretical yield of colored semi-crystalline powder having an inherent viscosity of 0.37, a weight average molecular weight of 27,625, a number average molecular weight of 19,130, a polydispersity value of 1.4 and a melting temperature of about 130° C.

COMPARATIVE EXAMPLE 4

The procedure described in Example 172 is repeated in part using the following materials:

| | |
|---|---|
| 106.2 g | (0.548 mol) dimethyl terephthalate |
| 79.97 g | (0.769 mol) 2,2-dimethyl-1,3-propanediol |
| 0.0145 g | Ti from a n-butanol solution of titanium tetraisopropoxide |
| 32.0 g | (0.085 mol) [[4-[bis[2-(acetyloxy)ethyl]amino]-2-methylphenyl]methylene]-propanedinitrile (from Comparative Example 1) |

After 5 minutes at a temperature of 275° C, stirring becomes difficult because of extreme thickening of the polymer melt, an indication that cross-linking has occurred, further indicating decomposition of the methine compound of Comparative Example 1. When crystallization of 25 g of the granulated polymer is attempted according to the procedure of Example 184, the polymer is found to be insoluble which further establishes the occurrence of cross-linking.

COMPARATIVE EXAMPLE 5

The procedure described in Example 172 is repeated in part using the following materials:

| | |
|---|---|
| 106.2 g | (0.548 mol) dimethyl terephthalate |
| 79.97 g | (0.769 mol) 2,2-dimethyl-1,3-propanediol |
| 0.0163 g | Ti from a n-butanol solution of titanium tetraisopropoxide |
| 33.8 g | (0.088 mol) [[4-bis[2-(ethoxycarbonyl)ethyl]]amino]-2-methylphenyl]-methylene]-propanedinitrile (from Comparative Example 2) |

When a temperature of 275° C. is reached, the polycondensation reaction occurs very rapidly and has to be stopped after about 10 minutes because of difficulty in stirring. The polymer is brownish-black in color, as opposed to yellow, which is further evidence of the thermal instability of the methine compound of Comparative Example 2.

COMPARATIVE EXAMPLE 6

The procedure described in Example 172 is repeated in part using the following materials:

| | |
|---|---|
| 76.7 g | (0.395 mol) dimethyl terephthalate |
| 63.64 g | (0.769 mol) 2,2-dimethyl-1,3-propanediol |
| 0.0118 g | Ti from a n-butanol solution of titanium tetraisopropoxide |
| 39.0 g | (0.142 mol) 2-cyano-3-[4-[ethyl-2-(hydroxyethyl)amino]-2-methylphenyl]-2-propenoic acid |

After polycondensation at 275° C. for 1 hour, the viscosity of the polymer melt is abnormally low. The polymer solidifies upon cooling and has a low inherent viscosity of 0.122, indicating that the methine colorant is functioning as a chain terminator, presumably as a result of decomposition of the carboxyl group via decarboxylation.

COMPARATIVE EXAMPLE 7

The procedure described in Example 172 is repeated in part using the following materials:

| | |
|---|---|
| 101.85 g | (0.525 mol) dimethyl terephthalate |
| 70.98 g | (0.683 mol) 2,2-dimethyl-1,3-propanediol |
| 0.0146 g | Ti from a n-butanol solution of titanium tetraisopropoxide |
| 44.98 g | (0.110 mol) 3-[4-[bis(2-acetyloxyethyl)-amino]-2-methylphenyl]-2-methyl-sulfonyl-2-propenenitrile |

After heating the polycondensation reaction mixture at a temperature of 275° C. for about 10 minutes, a rapid increase in viscosity occurs and stirring cannot be continued, which indicates that polymer cross-linking has occurred. The polymer color is brownish-black and a strong sulfur odor is present, both of which indicate colorant decomposition and thermal instability. The inherent viscosity of the polymer is 0.536, the weight average molecular weight is 58,898, the number average molecular weight is 9,745 and the polydispersity value is 6.0.

COMPARATIVE EXAMPLE 8

The procedure described in Example 172 is repeated using the following materials:

| | |
|---|---|
| 89.05 g | (0.459 mol) dimethyl terephthalate |
| 62.06 g | (0.597 mol) 2,2-dimethyl-1,3-propanediol |

-continued

| | |
|---|---|
| 0.0129 g | Ti from a n-butanol solution of titanium tetraisopropoxide |
| 39.94 g | (0.0944 mol) of the methine colorant having the structure: |

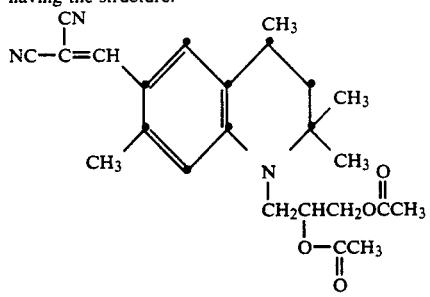

The polyester thus prepared is black in color instead of yellow, indicating thermal instability and colorant decomposition.

COMPARATIVE EXAMPLE 9

The procedure described in Example 173 is repeated in part using the following materials:

| | |
|---|---|
| 76.96 g | (0.397 mol) dimethyl terephthalate |
| 54.28 g | (0.875 mol) ethylene glycol |
| 0.00957 g | Ti from a n-butano solution of titanium tetraisopropoxide |
| 29.0 g | (0.081 mol) [[4-bis[2-(acetyloxy)ethyl]amino]-2-methylphenyl]methylene]-propanedinitrile (from Comparative Example 1) |

After heating for about 5 minutes at a temperature of 275° C., the reaction mixture becomes extremely thick and stirring has to be discontinued and the polymer has turned dark brownish-black, all of which indicates instability of the colorant. The vacuum is relieved with nitrogen and methyl benzoate (220 mL) is added with rapid stirring. The mixture is heated at reflux for 45 minutes and the polymer appears to be in solution. Upon cooling, the polymer separates as a hard black ball. It has an inherent viscosity of 0.244, a melting temperature of 156° C., a weight average molecular weight of 43,992, a number average molecular weight of 6,512 and a polydispersity value of 6.75.

COMPARATIVE EXAMPLE 10

The procedure described in Example 170 is repeated in part using the following materials:

| | |
|---|---|
| 136.04 g | (0.701 mol) dimethyl terephthalate |
| 86.95 g | (1.40 mol) ethylene glycol |
| 0.01655 g | Ti from a n-butanol solution of titanium tetraisopropoxide |
| 33.23 g | (0.088 mol) [[4-bis[2-(ethoxycarbonyl)ethyl]]amino]-2-methylphenyl]-methylene]-propanedinitrile (from Comparative Example 2) |

The reaction has to be stopped after about 10 minutes at 275° C. because of stirring difficulties. The polymer turns dark brownish-black indicating thermal instability of the methine colorant. A strong odor of ethyl acrylate is present which further indicates decomposition of the colorant.

COMPARATIVE EXAMPLE 11

The procedure described in Example 170 is repeated in part using the following materials:

| | |
|---|---|
| 147.6 g | (0.759 mol) dimethyl terephthalate |
| 99.2 g | (1.60 mol) ethylene glycol |
| 0.01536 g | Ti from a n-butanol solution of titanium tetraisopropoxide |
| 16.0 g | (0.041 mol) methyl 2-cyano-3-[4-[bis(2-acetyloxyethyl)amino]-2-methylphenyl]-2-propenoate |

After heating the reaction mixture at 275° C. for about 5 minutes, stirring is discontinued because of a rapid increase in viscosity which indicates that cross-linking has occurred. The resulting polymer has a low inherent viscosity of 0.061, a weight average molecular weight of 26,270, a number average molecular weight of 4,947, a polydispersity value of 5.31 and a melting temperature of 230° C.

COMPARATIVE EXAMPLE 12

The crystalline, cross-linked polymer from Comparative Example 11 (20.0 g) does not dissolve in methyl benzoate (150 mL) at 150° C. and at 180° C. it forms a soft gel, but does not dissolve. Heating is discontinued and the gel appears to solidify at about 115° C. with stirring. At 90° C., acetone (100 mL) addition is started, allowing the temperature to decrease. A smooth slurry is obtained upon further cooling and stirring. The slurry filters very slowly and the solid collected is reslurried four times in 200 mL of acetone and the polymer then is dried. It has an inherent viscosity of 0.298, a weight average molecular weight of 42,465, a number average molecular weight of 13,493 and a polydispersity value of 3.15.

COMPARATIVE EXAMPLE 13

The procedure described in Example 172 is repeated using the following materials:

| | |
|---|---|
| 106.22 g | (0.548 mol) dimethyl terephthalate |
| 79.97 g | (0.769 mol) 2,2-dimethyl-1,3-propanediol |
| 0.0164 g | Ti from a n-butanol solution of titanium tetraisopropoxide |
| 33.8 g | (0.088 mol) methyl 3-[4-[bis(phenylmethyl)amino]phenyl]-2-cyanopropenoate (from Comparative Example 3) |

After polycondensation at 275° C. for 1 hour, the viscosity of the polymer melt remains abnormally low. The polymer solidifies upon cooling and has a low inherent viscosity of 0.105, indicating that the methine colorant is functioning as a chain terminator. A portion (25 g) of the polyester is crystallized from ethyl acetate according to the procedure described in Example 184. The amount of the crystallized yellow polyester powder obtained is only 68.0% of theory. The crystallized polyester has an inherent viscosity of 0.156, a weight average molecular weight of 110,819, a number average molecular weight of 8,426, a polydispersity value of 1.28 and a melting temperature of 144° C.

COMPARATIVE EXAMPLE 14

The procedure described in Example 172 is repeated using the following materials:

75.88 g (0.391 mol) dimethyl terephthalate
60.09 g (0.577 mol) 2,2-dimethyl-1,3-propanediol
0.0124 g Ti from a n-butanol solution of titanium tetraisopropoxide
40.0 g (0.106 mol) of the methine colorant having the structure:

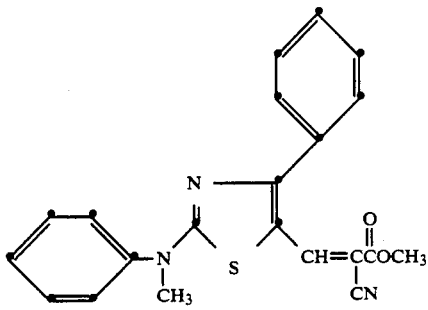

After polycondensation at 275° C. for 1 hour, the degree of polymerization appears low as evidenced by the low viscosity of the polymer melt. The polymer solidifies upon cooling and has a low inherent viscosity of 0.118, indicating that the methine colorant is functioning as a chain terminator.

The invention has been described in detail with particular reference to preferred embodiments thereof, but it will be understood that variations and modifications can be effected within the spirit and scope of the invention.

We claim:

1. A color concentrate comprising a polyester having copolymerized therein at least 1.0 weight percent, based on the weight of the concentrate, of the residue of one or more methine colorant compounds having the formula

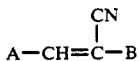

wherein
A is an aniline, 1,2,3,4-tetrahydroquinoline, 2,3-dihydro-1,4-benzoxazine or 2,3-dihydroindole residue of a methine colorant compound bearing one polyester. reactive substituent; and
B is an unsubstituted or substituted alkoxycarbonyl radical or an aromatic, carbocyclic or heterocyclic radical bearing one polyester-reactive substituent.

2. A color concentrate according to claim 1 comprising a polyester having an inherent viscosity of at least 0.20 having copolymerized therein at least 5.0 weight percent, based on the weight of the concentrate, of the residue of one or more methine colorant compounds having the formula:

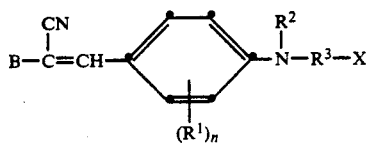

wherein
B is a radical having the formula:

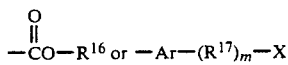

wherein $R^{16}$ is an unsubstituted or substituted alkyl, cycloalkyl or aryl radical; Ar is a divalent, aromatic, carbocyclic or heterocyclic radical; $R^{17}$ is a divalent linking group; and X is defined below;
$R^1$ is lower alkyl, lower alkoxy or halogen;
$R^2$ is an unsubstituted or substituted alkyl, cycloalkyl or aryl radical devoid of polyester-reactive groups;
$R^3$ is a divalent organic group;
n is 0, 1, 2 or 3; and
X is hydroxy, carboxy or an ester radical having the formula:

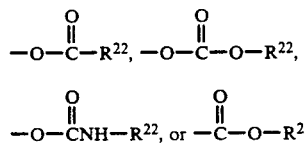

wherein $R^{22}$ is unsubstituted or substituted alkyl, cycloalkyl or aryl radical.

3. A color concentrate according to claim 1 comprising a polyester having an inherent viscosity of at least 0.20 having copolymerized therein about 10 to 40 weight percent, based on the weight of the polyester, of the residue of one or more methine colorant compounds having the formula:

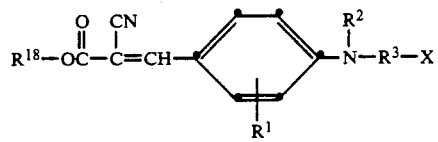

wherein
$R^1$ is hydrogen, methoxy, ethoxy, or chloro;
$R^2$ is lower alkyl; lower alkyl substituted with cyclohexyl, phenyl, phenoxy, lower alkoxy, halogen or cyano; allyl; cyclohexyl; or phenyl;
$R^3$—X is alkylene-OH, alkylene-O-alkylene-OH,

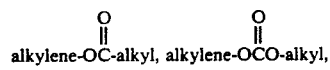

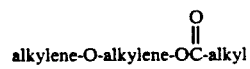

wherein each alkylene contains 2 to about 4 carbon atoms and each alkyl contains up to about 4 carbon atoms; and
$R^{18}$ is lower alkyl.

4. A color concentrate according to claim 1 comprising a polyester having an inherent viscosity of at least 0.20 having copolymerized therein at least 5.0 weight percent, based on the weight of the concentrate, of the residue of one or more methine colorant compounds having the formula:

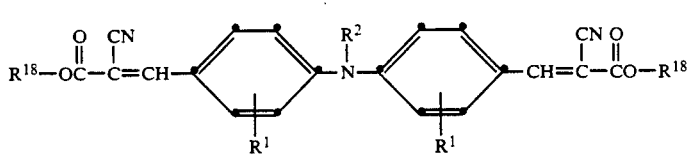

wherein
- $R^1$ is hydrogen, methyl, methoxy, ethoxy, or chloro;
- $R^2$ is lower alkyl; lower alkyl substituted with cyclohexyl, phenyl, phenoxy, lower alkoxy, halogen or cyano; allyl; cyclohexyl; or phenyl;
- $R^{18}$ is lower alkyl.

5. A color concentrate according to claim 1 comprising a polyester having an inherent viscosity of at least 0.20 having copolymerized therein at least 5.0 weight percent, based on the weight of the concentrate, of the residue of one or more methine colorant compounds having the formula:

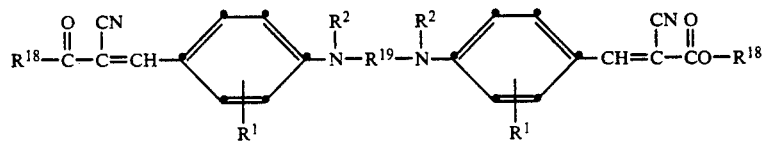

wherein
- $R^1$ is hydrogen, methyl, methoxy, ethoxy, or chloro;
- $R^2$ is lower alkyl; lower alkyl substituted with cyclohexyl, phenyl, phenoxy, lower alkoxy, halogen or cyano; allyl; cyclohexyl; or phenyl;
- $R^{18}$ is lower alkyl.
- $R^{19}$ is alkylene, alkylene-O-alkylene, alkylene-$SO_2$-alkylene, alkylene-phenylene-alkylene, alkylene-O-phenylene-alkylene,

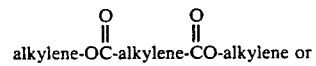
alkylene-OC-alkylene-CO-alkylene or

alkylene-OC-phenylene-CO-alkylene.

6. A color concentrate according to claim 1 comprising a polyester having an inherent viscosity of at least 0.20 having copolymerized therein at least 5.0 weight percent, based on the weight of the concentrate, of the residue of one or more methine colorant compounds having the formula:

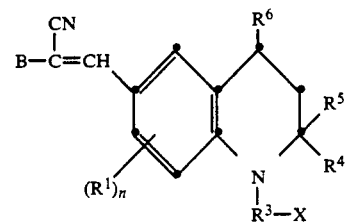

wherein
B is a radical having the formula:

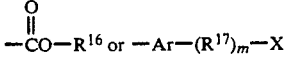

wherein $R^{16}$ is an unsubstituted or substituted alkyl, cycloalkyl or aryl radical; Ar is a divalent, aromatic, carbocyclic or heterocyclic radical; $R^{17}$ is a divalent linking group; and X is defined below;
- $R^1$ is lower alkyl, lower alkoxy or halogen;
- $R^3$ is a divalent organic group;
- $R^4$, $R^5$, and $R^6$ are the same or different and each represents hydrogen or lower alkyl;
- n is 0, 1, 2 or 3; and X is hydroxy, carboxy or an ester radical having the formula:

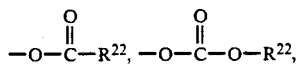

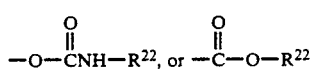

wherein $R^{22}$ is unsubstituted or substituted alkyl, cycloalkyl or aryl radical.

7. A color concentrate according to claim 1 comprising a polyester having an inherent viscosity of at least 0.20 having copolymerized therein about 10 to 40 weight percent, based on the weight of the polyester, of the residue of one or more methine colorant compounds having the formula:

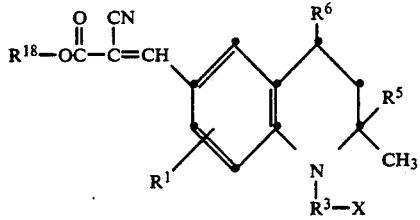

wherein
- $R^1$ is hydrogen, methyl, methoxy, ethoxy, or chloro;
- $R^3$-X is alkylene-OH, alkylene-O-alkylene-OH,

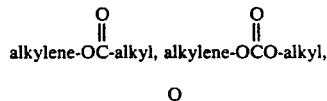
alkylene-OC-alkyl, alkylene-OCO-alkyl, $$\text{alkylene-phenylene-}\overset{O}{\overset{\|}{C}}\text{O-alkyl,}$$

-continued

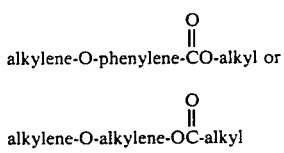

wherein each alkylene contains 2 to about 4 carbon atoms and each alkyl contains up to about 4 carbon atoms; and $R^5$ and $R^6$ each is hydrogen or methyl; and $R^{18}$ is lower alkyl

8. A color concentrate according to claim I comprising a polyester having an inherent viscosity of at least 0.20 having copolymerized therein at least 5.0 weight percent, based on the weight of the concentrate, of the residue of one or more methine colorant compounds having the formula:

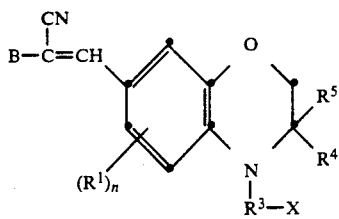

wherein
B is a radical having the formula:

wherein $R^{16}$ is an unsubstituted or substituted alkyl, cycloalkyl or aryl radical; Ar is a divalent, aromatic, carbocyclic or heterocyclic radical; $R^{17}$ is a divalent linking group; and X is defined below;
$R^1$ is lower alkyl, lower alkoxy or halogen;
$R^3$ is a divalent organic group;
$R^4$ and $R^5$ are the same or different and each represents hydrogen or lower alkyl;
n is 0, 1, 2, or 3; and
X is hydroxy, carboxy or an ester radical having the formula:

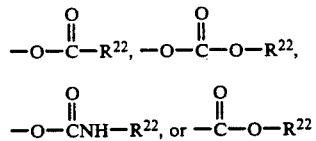

wherein $R^{22}$ is unsubstituted or substituted alkyl, cycloalkyl or aryl radical.

9. A color concentrate according to claim 8 wherein the polyester has copolymerized therein about 10 to 40 weight percent of the residue of one or more of the methine colorant and wherein:
B is a radical having the formula

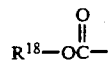

wherein $R^{18}$ is lower alkyl;

$R^1$ is methyl, methoxy, ethoxy, or chloro; and
n is 0 or 1;
$R^3$-X is alkylene-OH, alkylene-O-alkylene-OH,

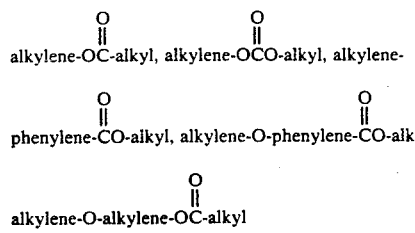

wherein each alkylene contains 2 to about 4 carbon atoms and each alkyl contains up to about 4 carbon atoms; and

10. A color concentrate according to claim 1 comprising a polyester having an inherent viscosity of at least 0.20 having copolymerized therein at least 5.0 weight percent, based on the weight of the concentrate, of the residue of one or more methine colorant compounds having the formula:

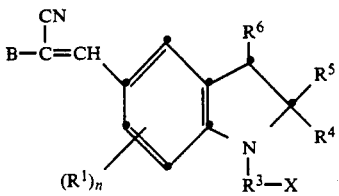

wherein
B is a radical having the formula:

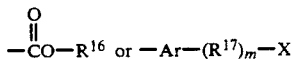

wherein $R^{16}$ is an unsubstituted or substituted alkyl, cycloalkyl or aryl radical; Ar is a divalent, aromatic, carbocyclic or heterocyclic radical; $R^{17}$ is a divalent linking group; and X is defined below;
$R^1$ is lower alkyl, lower alkoxy or halogen;
$R^3$ is a divalent organic group;
$R^6$ is hydrogen or lower alkyl;
$R^4$ and $R^5$ are the same or different and each represents lower alkyl or an unsubstituted or substituted aryl radical; and
n is 0, 1, 2, or 3;
X is hydroxy, carboxy or an ester radical having the formula:

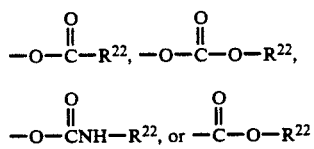

wherein $R^{22}$ is unsubstituted or substituted alkyl, cycloalkyl or aryl radical.

11. A color concentrate according to claim 10 wherein the polyester has copolymerized therein about 10 to 40 weight percent of the residue of one or more of the methine colorant and wherein:
B is a radical having the formula

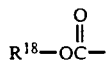

wherein $R^{18}$ is lower alkyl;
$R^1$ is methyl, methoxy, ethoxy, or chloro; and
n is 0 or 1;
$R^3$-X is alkylene-OH, alkylene-O-alkylene-OH,

wherein each alkylene contains 2 to about 4 carbon atoms and each alkyl contains up to about 4 carbon atoms; and 12. A color concentrate according to claim 1 comprising a polyester having an inherent viscosity of at least 0.20 having copolymerized therein at least 5.0 weight percent, based on the weight of the concentrate, of the residue of one or more methine colorant compounds having the formula:

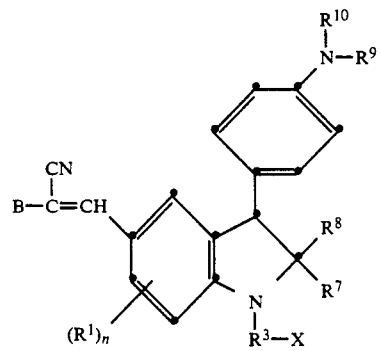

wherein
B is a radical having the formula:

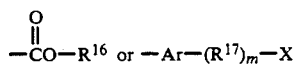

wherein $R^{16}$ is an unsubstituted or substituted alkyl, cycloalkyl or aryl radical; Ar is a divalent, aromatic, carbocyclic or heterocyclic radical; $R^{17}$ is a divalent linking group; and X is defined below;
$R^1$ is lower alkyl, lower alkoxy or halogen;
$R^3$ is a divalent organic group;
$R^7$ and $R^8$ are the same or different and each represents lower alkyl or an unsubstituted or substituted aryl radical; and
n is 0, 1, 2, or 3; and
X is hydroxy, carboxy or an ester radical having the formula:

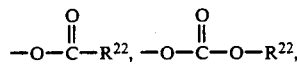

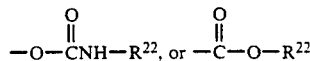

wherein $R^{22}$ is unsubstituted or substituted alkyl, cycloalkyl or aryl radical.

13. An amorphous color concentrate comprising an amorphous polyester having copolymerized therein at least 5.0 weight percent, based on the weight of the concentrate, of the residue of one or more methine colorant compounds having the formula:

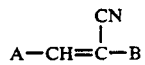

wherein
A is an aniline, 1,2,3,4-tetrahydroquinoline, 2,3-dihydro-1,4-benzoxazine or 2,3-dihydroindole residue of a methine colorant compound bearing one polyester-reactive substituent; and
B is an unsubstituted or substituted alkoxycarbonyl radical or an aromatic, carbocyclic or heterocyclic radical bearing one polyester-reactive substituent.

14. An amorphous color concentrate according to claim 13 comprising a polyester having an inherent viscosity of at least 0.20 comprised of:
(i) diacid residues comprised of at least 50 mole percent terephthalic and/or 2,6-naphthalene-dicarboxylic acid residues;
(ii) diol residues comprised of at least 50 mole percent of the residue of a diol having the formula:

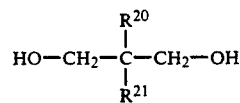

wherein $R^{20}$ is hydrogen or lower alkyl and $R^{21}$ is lower alkyl; and
(iii) residues of one or more methine colorant compounds having the formula:

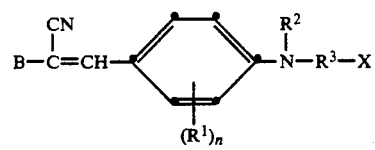

wherein
B is a radical having the formula:

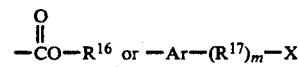

wherein $R^{16}$ is an unsubstituted or substituted alkyl, cycloalkyl or aryl radical; Ar is a divalent, aromatic, carbocyclic or heterocyclic radical; $R^{17}$ is a divalent linking group; and X is defined below;
$R^1$ is lower alkyl, lower alkoxy or halogen;
$R^2$ is an unsubstituted or substituted alkyl, cycloalkyl or aryl radical devoid of polyester-reactive groups;
$R^3$ is a divalent organic group;
n is 0, 1, 2 or 3; and X is hydroxy, carboxy or an ester radical having the formula:

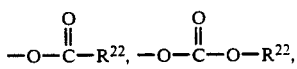, 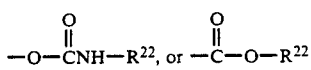

wherein $R^{22}$ is unsubstituted or substituted alkyl, cycloalkyl or aryl radical; provided that component (iii) constitutes at least 5.0 weight percent of the concentrate.

15. An amorphous color concentrate according to claim 13 comprising a polyester having an inherent viscosity of 0.20 to 0.80 and a melting temperature of at least 110° C. comprised of:
(i) diacid residues comprised of at least 80 mole percent terephthalic and/or 2,6-naphthalene-dicarboxylic acid residues;
(ii) diol residues comprised of at least 80 mole percent of the residue of a diol having the formula:

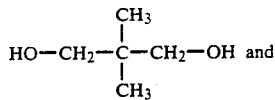

(iii) residues of one or more methine colorant compounds having the formula:

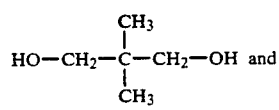

wherein
$R^1$ is hydrogen, methyl, methoxy, ethoxy, or chloro;
$R^2$ is lower alkyl; lower alkyl substituted with cyclohexyl, phenyl, phenoxy, lower alkoxy, halogen or cyano; allyl; cyclohexyl; or phenyl;
$R^3$-X is alkylene-OH, alkylene-O-alkylene-OH, alkylene-OC-alkyl, alkylene-OCO-alkyl, alkylenephenylene-CO-alkyl, alkylene-O-phenylene-CO-alkyl or -continued alkylene-O-alkylene-OC-alkyl wherein each alkylene contains 2 to about 4 carbon atoms and each alkyl contains up to about 4 carbon atoms; and
$R^{18}$ is lower alkyl; provided that component (iii) constitutes about 10 to 40 weight percent of the concentrate.

16. An amorphous color concentrate according to claim 13 comprising a polyester having an inherent viscosity of 0.20 to 0.80 and a melting temperature of at least 110° C. comprised of:
(i) diacid residues comprised of at least 80 mole percent terephthalic and/or 2,6-naphthalene-dicarboxylic acid residues;
(ii) diol residues comprised of at least 80 mole percent of the residue of a diol having the formula:

(iii) residues of one or more methine colorant compounds having the formula:

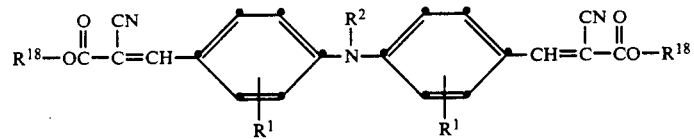

wherein
$R^1$ is hydrogen, methyl, methoxy, ethoxy, or chloro;
$R^2$ is lower alkyl; lower alkyl substituted with cyclohexyl, phenyl, phenoxy, lower alkoxy, halogen or cyano; allyl; cyclohexyl; or phenyl;
$R^{18}$ is lower alkyl; provided that component (iii) constitutes about 10 to 40 weight percent of the concentrate.

17. An amorphous color concentrate according to claim 13 comprising a polyester having an inherent viscosity of 0.20 to 0.80 and a melting temperature of at least 110° C. comprised of:
(i) diacid residues comprised of at least 80 mole percent terephthalic and/or 2,6-naphthalene-dicarboxylic acid residues;
(ii) diol residues comprised of at least 80 mole percent of the residue of a diol having the formula:

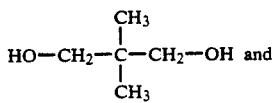

(iii) residues of one or more methine colorant compounds having the formula:

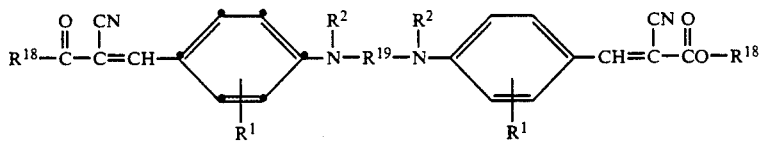

wherein
$R^1$ is hydrogen, methyl, methoxy, ethoxy, or chloro;
$R^2$ is lower alkyl; lower alkyl substituted with cyclohexyl, phenyl, phenoxy, lower alkoxy, halogen or cyano; allyl; cyclohexyl; or phenyl;
$R^{18}$ is lower alkyl;
$R^{19}$ is alkylene, alkylene-O-alkylene, alkylene-$SO_2$-alkylene, alkylene-phenylene-alkylene, alkylene-O-phenylene-alkylene, phenylene-alkylene,

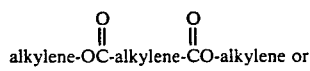
alkylene-OC-alkylene-CO-alkylene or

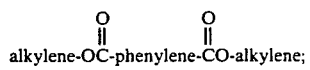
alkylene-OC-phenylene-CO-alkylene;

provided that component (iii) constitutes about 10 to 40 weight percent of the concentrate.

18. An amorphous color concentrate according to claim 13 comprising a polyester having an inherent viscosity of at least 0.20 comprised of:
(i) diacid residues comprised of at least 50 mole percent terephthalic and/or 2,6-naphthalene-dicarboxylic acid residues;
(ii) diol residues comprised of at least 50 mole percent of the residue of a diol having the formula:

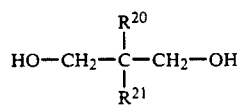

wherein $R^{20}$ is hydrogen or lower alkyl and $R^{21}$ is lower alkyl; and
(iii) residues of one or more methine colorant compounds having the formula:

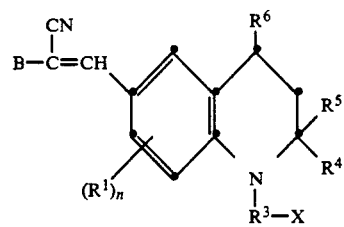

wherein
B is a radical having the formula:

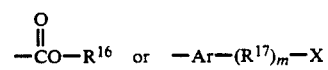

wherein $R^{16}$ is an unsubstituted or substituted alkyl, cycloalkyl or aryl radical; Ar is a divalent, aromatic, carbocyclic or heterocyclic radical; $R^{17}$ is a divalent linking group; and X is defined below;

$R^1$ is lower alkyl, lower alkoxy or halogen;
$R^3$ is a divalent organic group;
$R^4$, $R^5$, and $R^6$ are the same or different and each represents hydrogen or lower alkyl;
n is 0, 1, 2 or 3; and
X is hydroxy, carboxy or an ester radical having the formula:

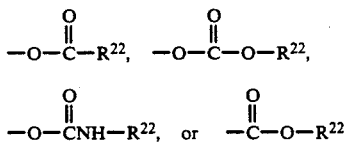

wherein $R^{22}$ is unsubstituted or substituted alkyl, cycloalkyl or aryl radical; provided that component (iii) constitutes at least 5.0 weight percent of the concentrate.

19. An amorphous color concentrate according to claim 13 comprising a polyester having an inherent viscosity of 0.20 to 0.80 and a melting temperature of at least 110° C. comprised of:
(i) diacid residues comprised of at least 80 mole percent terephthalic and/or 2,6-naphthalene-dicarboxylic acid residues;
(ii) diol residues comprised of at least 80 mole percent of the residue of a diol having the formula:

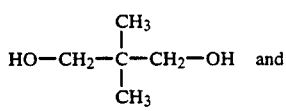

(iii) residues of one or more methine colorant compounds having the formula:

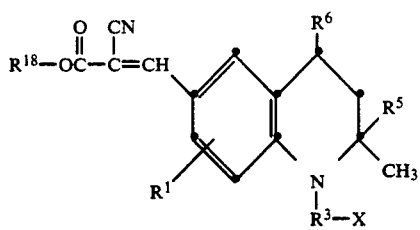

wherein
$R^1$ is hydrogen, methyl, methoxy, ethoxy, or chloro;
$R^3$-X is alkylene-OH, alkylene-O-alkylene-OH,

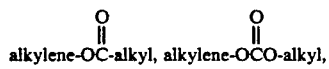
alkylene-OC-alkyl, alkylene-OCO-alkyl,

alkylene-phenylene-CO-alkyl,

alkylene-O-phenylene-CO-alkyl or

-continued alkylene-O-alkylene-O$\overset{\overset{\text{O}}{\|}}{C}$-alkyl wherein each alkylene contains 2 to about 4 carbon atoms and each alkyl contains up to about 4 carbon atoms; and $R^5$ and $R^6$ each is hydrogen or methyl; and $R^{18}$ is lower alkyl; provided that component (iii) constitutes about 10 to 40 weight percent of the concentrate.

20. A partially-crystalline polyester color concentrate comprised of:
(i) diacid residues consisting of at least 80 mole percent terephthalic acid residues, 2,6-naphthalenedicarboxylic acid residues, 1,3-cyclohexanedicarboxylic acid residues, 1,4-cyclohexanedicarboxylic acid residues or a mixture thereof;
(ii) diol residues consisting of at least 50 mole percent of residues having the formula: —O—(CH$_2$-)$_p$—O—wherein p is 2 to 12; and
(iii) residues of one or more methine colorant compounds having the formula:

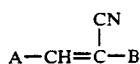

wherein
A is an aniline, 1,2,3,4-tetrahydroquinoline, 2,3-dihydro-1,4-benzoxazine or 2,3-dihydroindole residue of a methine colorant compound bearing one polyester-reactive substituent; and
B is an unsubstituted or substituted alkoxycarbonyl radical or an aromatic, carbocyclic or heterocyclic radical bearing one polyester-reactive substituent; provided that component (iii) constitutes at least 5.0 weight percent of the concentrate.

21. A partially-crystalline polyester color concentrate according to claim 20 comprised of:
(i) diacid residues consisting of at least 80 mole percent terephthalic acid residues;
(ii) diol residues consisting of at least 80 mole percent of residues of having the formula —O—(CH$_2$-)$_p$—O—wherein p is 4 to 12; and
(iii) residues of one or more methine colorant compounds having the formula:

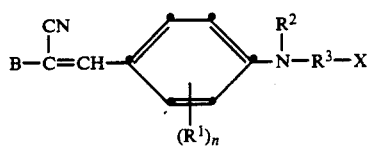

wherein
B is a radical having the formula:

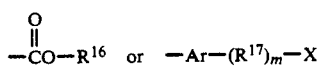

wherein $R^{16}$ is an unsubstituted or substituted alkyl, cycloalkyl or aryl radical; Ar is a divalent, aromatic, carbocyclic or heterocyclic radical; $R^{17}$ is a divalent linking group; and X is defined below;
$R^1$ is lower alkyl, lower alkoxy or halogen;
$R^2$ is an unsubstituted or substituted alkyl, cycloalkyl or aryl radical devoid of polyester-reactive groups;
$R^3$ is a divalent organic group;
n is 0, 1, 2 or 3; and
X is hydroxy, carboxy or an ester radical having the formula:

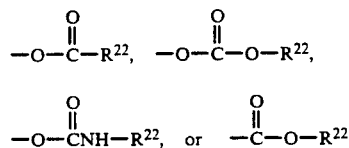

wherein $R^{22}$ is unsubstituted or substituted alkyl, cycloalkyl or aryl radical; provided that component (iii) constitutes at least 5.0 weight percent of concentrate.

22. A partially-crystalline polyester color concentrate according to ciaim 21 wherein residues (iii) are derived from one or more methine colorant compounds having the formula:

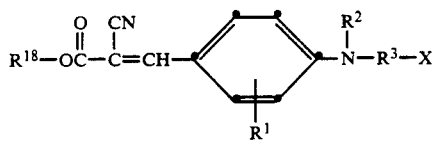

wherein
$R^1$ is hydrogen, methyl, methoxy, ethoxy, or chloro;
$R^2$ is lower alkyl; lower alkyl substituted with cyclohexyl, phenyl, phenoxy, lower alkoxy, halogen or cyano; allyl; cyclohexyl; or phenyl;
$R^3$-X is alkylene-OH, alkylene-0.alkylene-OH,

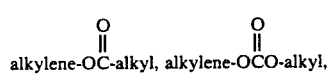

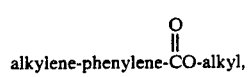

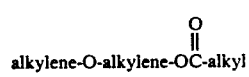

wherein each alkylene contains 2 to about 4 carbon atoms and each alkyl contains up to about 4 carbon atoms; and
$R^{18}$ is lower alkyl;
and wherein component (iii) constitutes about 10 to 40 weight percent of the concentrate.

23. A partially-crystalline polyester color concentrate according to claim 21 wherein residues (ii) have the formula —O—(CH$_2$)$_4$—O—and residues (iii) are derived from one or more methine colorant compounds having the formula:

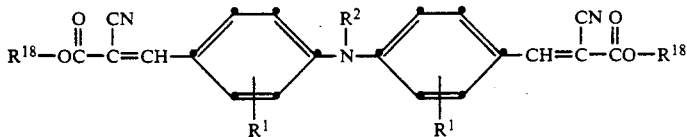

wherein
- $R^1$ is hydrogen, methyl, methoxy, ethoxy, or chloro;
- $R^2$ is lower alkyl; lower alkyl substituted with cyclohexyl, phenyl, phenoxy, lower alkoxy, halogen or cyano; allyl; cyclohexyl; or phenyl;
- $R^{18}$ is lower alkyl; and wherein component (iii) constitutes about 10 to 40 weight percent of the concentrate.

24. A partially-crystalline polyester color concentrate according to claim 21 wherein residues (iii) are derived from one or more methine colorant compounds having the formula:

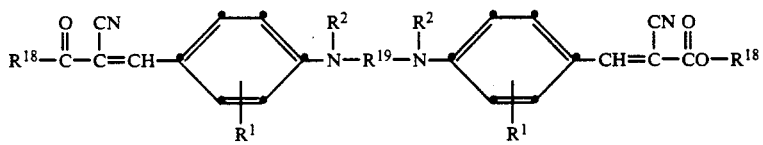

wherein
- $R^1$ is hydrogen, methyl, methoxy, ethoxy, or chloro;
- $R^2$ is lower alkyl; lower alkyl substituted with cyclohexyl, phenyl, phenoxy, lower alkoxy, halogen or cyano; allyl; cyclohexyl; or phenyl;
- $R^{18}$ is lower alkyl;
- $R^{19}$ is alkylene, alkylene-O-alkylene, alkylene-$SO_2$-alkylene, alkylene-phenylene-alkylene, alkylene-O-phenylene-alkylene,

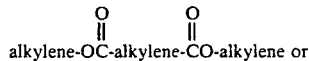
alkylene-OC-alkylene-CO-alkylene or

alkylene-OC-phenylene-CO-alkylene;

and wherein component (iii) constitutes about 10 to 40 weight percent of the concentrate.

25. A partially-crystalline polyester color concentrate according to claim 20 comprised of:
(i) diacid residues consisting of at least 80 mole percent terephthalic acid residues;
(ii) diol residues consisting of at least 80 mole percent of residues having the formula -O-$(CH_2)_p$-O- wherein p is 4 to 12; and
(iii) residues of one or more methine colorant compounds having the formula:

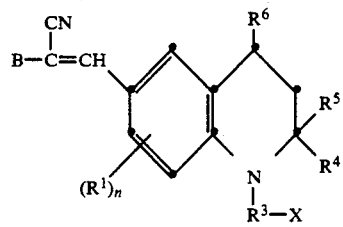

wherein

B is a radical having the formula:

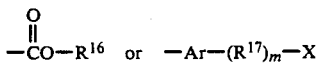

wherein $R^{16}$ is an unsubstituted or substituted alkyl, cycloalkyl or aryl radical; Ar is a divalent, aromatic, carbocyclic or heterocyclic radical; $R^{17}$ is a divalent linking group; and X is defined below;
- $R^1$ is lower alkyl, lower alkoxy or halogen;
- $R^3$ is a divalent organic group;
- $R^4$, $R^5$, and $R^6$ are the same or different and each represents hydrogen or lower alkyl;
- n is 0, 1, 2 or 3; and
- X is hydroxy, carboxy or an ester radical having the formula:

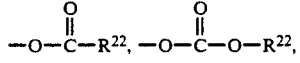

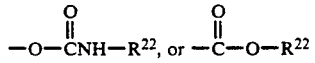

wherein $R^{22}$ is unsubstituted or substituted alkyl, cycloalkyl or aryl radical; provided that component (iii) constitutes at least 1.0 weight percent of concentrate.

26. A partially-crystalline polyester color concentrate according to claim 25 wherein residues (ii) have the formula -O-$(CH_2)_4$-O- and residues (iii) are derived from one or more methine colorant compounds having the formula:

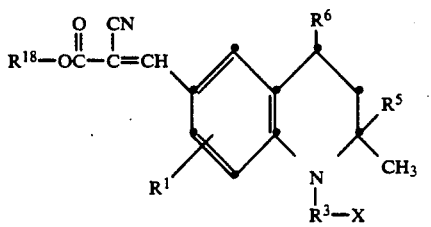

wherein
- $R^1$ is hydrogen, methyl, methoxy, ethoxy, or chloro;
- $R^3$-X is alkylene-OH, alkylene-O-alkylene-OH,

alkylene-OC-alkyl, alkylene-OCO-alkyl, alkylene-

-continued

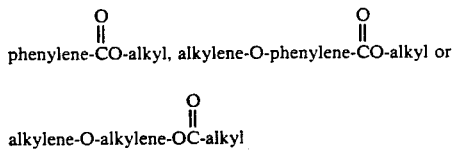
phenylene-CO-alkyl, alkylene-O-phenylene-CO-alkyl or $$\text{alkylene-O-alkylene-O}\overset{O}{\underset{\|}{C}}\text{-alkyl}$$

wherein each alkylene contains 2 to about 4 carbon atoms and each alkyl contains up to about 4 carbon atoms; and $R^5$ and $R^6$ each is hydrogen or methyl; and $R^{18}$ is lower alkyl;

and wherein component (iii) constitutes about 10 to 40 weight percent of the concentrate.

27. A colored semicrystalline powder having an average particle size of less than 30 microns comprising a normally-amorphous polyester which has been modified by dissolution-crystallization-precipitation to impart crystallinity thereto having copolymerized therein at least 5.0 weight percent, based on the weight of the concentrate, of the residue of one or more methine colorant compounds having the formula:

$$\text{A}-\text{CH}=\overset{\underset{|}{\text{CN}}}{\text{C}}-\text{B}$$

wherein

A is an aniline, 1,2,3,4-tetrahydroquinoline, 2,3-dihydro-1,4-benzoxazine or 2,3-dihydroindole residue of a methine colorant compound bearing one polyester-reactive substituent; and B is an unsubstituted or substituted alkoxycarbonyl radical or an aromatic, carbocyclic or heterocyclic radical bearing one polyester-reactive substituent.

28. A colored semicrystalline powder according to claim 27 comprising a polyester having an inherent viscosity of at least 0.20 comprised of:

(i) diacid residues comprised of at least 50 mole percent terephthalic and/or 2,6-naphthalene-dicarboxylic acid residues;

(ii) diol residues comprised of at least 50 mole percent of the residue of a diol having the formula:

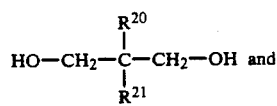

wherein $R^{20}$ is hydrogen or lower alkyl and $R^{21}$ is lower alkyl; and (iii) residues of one or more methine colorant compounds having the formula:

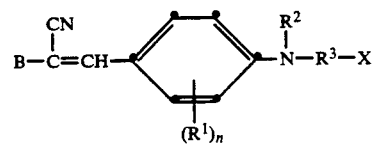

wherein

B is a radical having the formula:

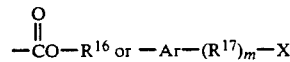

wherein $R^{16}$ is an unsubstituted or substituted alkyl, cycloalkyl or aryl radical; Ar is a divalent, aromatic, carbocyclic or heterocyclic radical; $R^{17}$ is a divalent linking group; and X is defined below;

$R^1$ is lower alkyl, lower alkoxy or halogen;

$R^2$ is an unsubstituted or substituted alkyl, cycloalkyl or aryl radical devoid of polyester-reactive groups;

$R^3$ is a divalent organic group;

n is 0, 1, 2 or 3; and

X is hydroxy, carboxy or an ester radical having the formula:

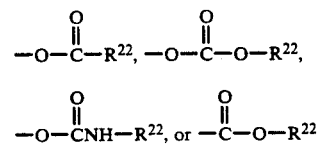

wherein $R^{22}$ is unsubstituted or substituted alkyl, cycloalkyl or aryl radical; provided that component (iii) constitutes at least 5.0 weight percent of the concentrate.

29. A colored semicrystalline powder according to claim 27 having an average particle size of less than 30 microns comprising a normally-amorphous polyester which has been modified by dissolution-crystallization-precipitation to impart crystallinity thereto comprised of:

(i) diacid residues comprised of at least 80 mole percent terephthalic and/or 2,6-naphthalene-dicarboxylic acid residues;

(ii) diol residues comprised of at least 80 mole percent of the residue of a diol having the formula:

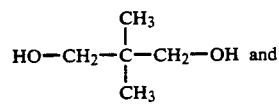

(iii) residues of one or more methine colorant compounds having the formula:

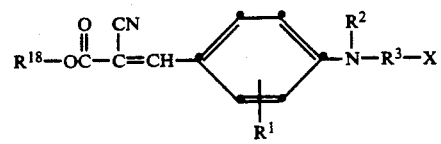

wherein $R^1$ is hydrogen, methyl, methoxy, ethoxy, or chloro;

$R^2$ is lower alkyl; lower alkyl substituted with cyclohexyl, phenyl, phenoxy, lower alkoxy, halogen or cyano; allyl; cyclohexyl; or phenyl;

$R^3$-X is alkylene-OH, alkylene-O-alkylene-OH,

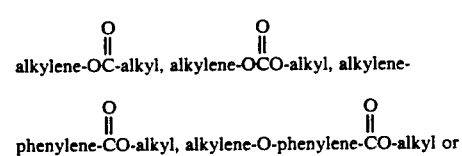
alkylene-OC-alkyl, alkylene-OCO-alkyl, alkylene-
phenylene-CO-alkyl, alkylene-O-phenylene-CO-alkyl or -continued

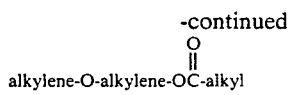

wherein each alkylene contains 2 to about 4 carbon atoms and each alkyl contains up to about 4 carbon atoms; and $R^{18}$ is lower alkyl; provided that component (iii) constitutes about 10 to 40 weight percent of concentrate.

30. A colored semicrystalline powder according to claim 27 having an average particle size of less than 30 microns comprising a normally-amorphous polyester which has been modified by dissolution-crystallization-precipitation to impart crystallinity thereto comprised of:
(i) diacid residues comprised of at least 80 mole percent terephthalic and/or 2,6-naphthalene-dicarboxylic acid residues;
(ii) diol residues comprised of at least 80 mole percent of the residue of a diol having the formula:

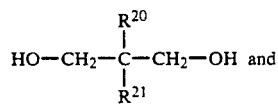

wherein $R^{20}$ is hydrogen or lower alkyl and $R^{21}$ is lower alkyl; and
(iii) residues of one or more methine colorant compounds having the formula:

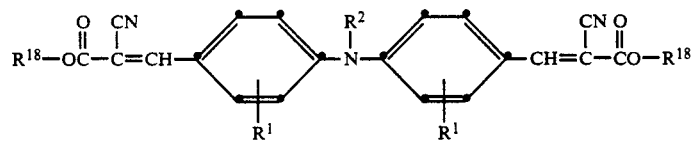

wherein
$R^1$ is hydrogen, methyl, methoxy, ethoxy, or chloro;
$R^2$ is lower alkyl; lower alkyl substituted with cyclohexyl, phenyl, phenoxy, lower alkoxy, halogen or cyano; allyl; cyclohexyl; or phenyl;
$R^{18}$ is lower alkyl; provided that component (iii) constitutes about 10 to 40 weight percent of concentrate.

31. A colored semicrystalline powder according to claim 27 having an average particle size of less than 30 microns comprising a normally-amorphous polyester which has been modified by dissolution-crystallization-precipitation to impart crystallinity thereto comprised of:
(i) diacid residues comprised of at least 80 mole percent terephthalic and/or 2,6-naphthalene-dicarboxylic acid residues;
(ii) diol residues comprised of at least 80 mole percent of the residue of a diol having the formula:

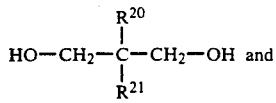

wherein $R^{20}$ is hydrogen or lower alkyl and $R^{21}$ is lower alkyl; and
(iii) residues of one or more methine colorant compounds having the formula:

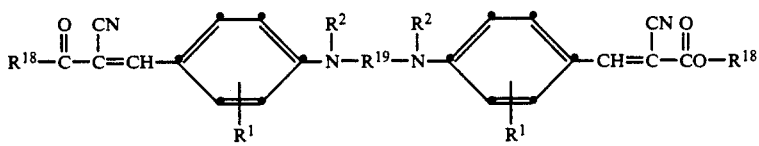

wherein
$R^1$ is hydrogen, methyl, methoxy, ethoxy, or chloro;
$R^2$ is lower alkyl; lower alkyl substituted with cyclohexyl, phenyl, phenoxy, lower alkoxy, halogen or cyano; allyl; cyclohexyl; or phenyl;
$R^{18}$ is lower alkyl;
$R^{19}$ is alkylene, alkylene-O-alkylene, alkylene-SO$_2$-alkylene, alkylene-phenylene-alkylene, alkylene-O-phenylene-alkylene, $$\text{alkylene-O}\overset{O}{\overset{\|}{C}}\text{-alkylene-}\overset{O}{\overset{\|}{C}}\text{O-alkylene or}$$

$$\text{alkylene-O}\overset{O}{\overset{\|}{C}}\text{-phenylene-}\overset{O}{\overset{\|}{C}}\text{O-alkylene;}$$

provided that component (iii) constitutes about 10 to 40 weight percent of concentrate.

32. A colored semicrystalline powder according to claim 27 comprising a polyester having an inherent viscosity of at least 0.20 comprised of:
(i) diacid residues comprised of at least 50 mole percent terephthalic and/or 2,6.naphthalene-dicarboxylic acid residues;
(ii) diol residues comprised of at least 50 mole percent of the residue of a diol having the formula:

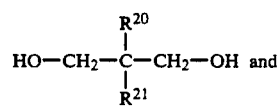

(iii) residues of one or more methine colorant compounds having the formula:

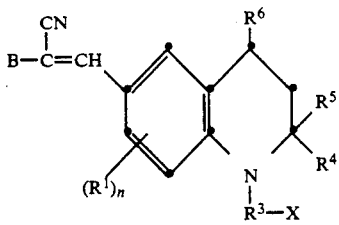

wherein
B is a radical having the formula:

wherein $R^{16}$ is an unsubstituted or substituted alkyl, cycloalkyl or aryl radical; Ar is a divalent, aromatic, carbocyclic or heterocyclic radical; $R^{17}$ is a divalent linking group; and X is defined below;
$R^1$ is lower alkyl, lower alkoxy or halogen;
$R^3$ is a divalent organic group;
$R^4$, $R^5$, and $R^6$ are the same or different and each represents hydrogen or lower alkyl;
n is 0, 1, 2 or 3; and
X is hydroxy, carboxy or an ester radical having the formula:

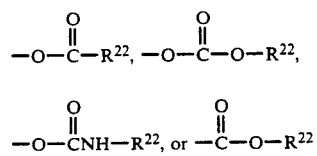

wherein $R^{22}$ is unsubstituted or substituted alkyl, cycloalkyl or aryl radical; provided that component (iii) constitutes at least 5.0 weight percent of the concentrate.

33. A colored semicrystalline powder according to claim 27 having an average particle size of less than 30 microns comprising a normally-amorphous polyester which has been modified by dissolution-crystallization precipitation to impart crystallinity thereto comprised of:
   (i) diacid residues comprised of at least 80 mole percent terephthalic and/or 2,6-naphthalene-dicarboxylic acid residues;
   (ii) diol residues comprised of at least 80 mole percent of the residue of a diol having the formula:

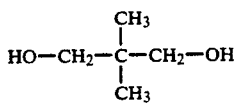

and
   (iii) residues of one or more methine colorant compounds having the formula:

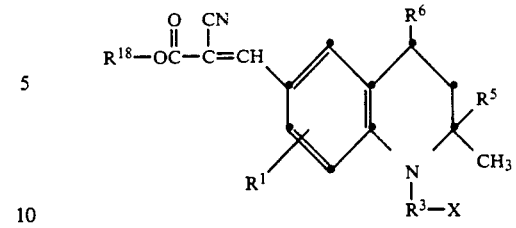

wherein
$R^1$ is hydrogen, methyl, methoxy, ethoxy, or chloro;
$R^3$-X is alkylene-OH, alkylene-O-alkylene-OH,

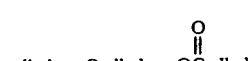

wherein each alkylene contains 2 to about 4 carbon atoms and each alkyl contains up to about 4 carbon atoms; and
$R^5$ and $R^6$ each is hydrogen or methyl; and
$R^{18}$ is lower alkyl; provided that component (iii) constitutes about 10 to 40 weight percent of concentrate.

34. A colored semicrystalline powder having an average particle size of less than 30 microns comprising a partially-crystalline polyester which had been modified by dissolution-crystallization-precipitation to impart increased crystallinity thereto comprised of:
   (i) diacid residues consisting of at least 80 mole percent terephthalic acid residues, 2,6-naphthalenedicarboxylic acid residues, 1,3-cyclohexanedicarboxylic acid residues, 1,4-cyclohexanedicarboxylic acid residues or a mixture thereof;
   (ii) diol residues consisting of at least 50 mole percent of residues having the formula -O-$(CH_2)_p$-O- wherein p is 2 to 12; and
   (iii) residues of one or more methine colorant compounds having the formula:

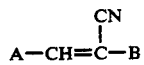

wherein
A is an aniline, 1,2,3,4-tetrahydroquinoline, 2,3-dihydro-1,4-benzoxazine or 2,3-dihydroindole residue of a methine colorant compound bearing one polyester-reactive substituent; and
B is an unsubstituted or substituted alkoxycarbonyl radical or an aromatic, carbocyclic or heterocyclic radical bearing one polyester-reactive substituent; provided that component (iii) constitutes at least 5.0 weight percent of the concentrate.

35. A colored semicrystalline powder having an average particle size of less than 30 microns comprising a partially-crystalline polyester which had been modified by dissolution-crystallization-precipitation to impart increased crystallinity thereto comprised of:

(i) diacid residues consisting of at least 80 mole percent terephthalic acid residues, 2,6-naphthalenedicarboxylic acid residues, 1,3-cyclohexanedicarboxylic acid residues, 1,4-cyclohexanedicarboxylic acid residues or a mixture thereof;

(ii) diol residues consisting of at least 50 mole percent of residues having the formula -O-(CH$_2$)$_p$-O- wherein p is 4 to 12; and (iii) residues of one or more methine colorant compounds having the formula:

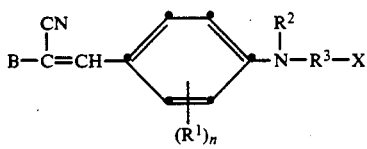

wherein

B is a radical having the formula:

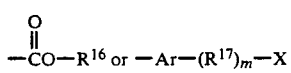

wherein R$^{16}$ is an unsubstituted or substituted alkyl, cycloalkyl or aryl radical; Ar is a divalent, aromatic, carbocyclic or heterocyclic radical; R$^{17}$ is a divalent linking group; and X is defined below;

R$^1$ is lower alkyl, lower alkoxy or halogen;

R$^2$ is an unsubstituted or substituted alkyl, cycloalkyl or aryl radical devoid of polyester-reactive groups;

R$^3$ is a divalent organic group;

n is 0, 1, 2 or 3; and

X is hydroxy, carboxy or an ester radical having the formula:

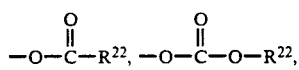

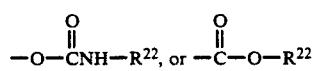

wherein R$^{22}$ is unsubstituted or substituted alkyl, cycloalkyl or aryl radical; provided that component (iii) constitutes at least 51.0 weight percent of the concentrate.

36. A colored semicrystalline powder according to claim 34 comprising a polyester having an inherent viscosity of at least 0.20 and a melting temperature of at least 110° C. comprised of:

(i) diacid residues consisting of at least 80 mole percent terephthalic acid residues;

(ii) diol residues consisting of at least 80 mole percent of residues of 1,4-butanediol; and (iii) residues of one or more methine colorant compounds having the formula:

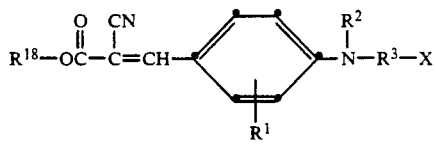

wherein

R$^1$ is hydrogen, methyl, methoxy, ethoxy, or chloro;

R$^2$ is lower alkyl; lower alkyl substituted with cyclohexyl, phenyl, phenoxy, lower alkoxy, halogen or cyano; allyl; cyclohexyl; or phenyl;

R$^3$-X is alkylene-OH, alkylene-O-alkylene-OH,

wherein each alkylene contains 2 to about 4 carbon atoms and each alkyl contains up to about 4 carbon atoms; and R$^{18}$ is lower alkyl; provided that component (iii) constitutes about 10 to 40 weight percent of concentrate.

37. A colored semicrystalline powder according to claim 34 comprising a polyester having an inherent viscosity of at least 0.20 and a melting temperature of at least 110° C. comprised of:

(i) diacid residues consisting of at least 80 mole percent terephthalic acid residues;

(ii) diol residues consisting of at least 80 mole percent of residues having the formula -O-(CH$_2$)$_p$-O- wherein p is 4 to 12; and (iii) residues of one or more methine colorant compounds having the formula:

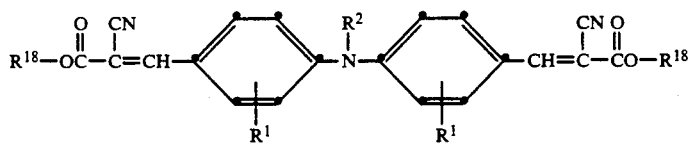

wherein

R$^1$ is hydrogen, methyl, methoxy, ethoxy, or chloro;

R$^2$ is lower alkyl; lower alkyl substituted with cyclohexyl, phenyl, phenoxy, lower alkoxy, halogen or cyano; allyl; cyclohexyl; or phenyl;

R$^{18}$ is lower alkyl; provided that component (iii) constitutes about 10 to 40 weight percent of concentrate.

38. A colored semicrystalline powder according to claim 34 comprising a polyester having an inherent viscosity of at least 0.20 and a melting temperature of at least 110° C. comprised of:

(i) diacid residues consisting of at least 80 mole percent terephthalic acid residues;

(ii) diol residues consisting of at least 80 mole percent of residues having the formula -O-(CH2)$_p$-O- wherein p is 4 to 12; and (iii) residues of one or more methine colorant compounds having the formula:

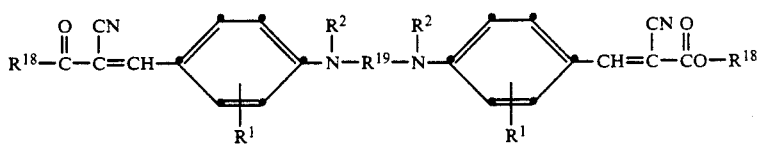

wherein
R¹ is hydrogen, methyl, methoxy, ethoxy, or chloro;
R² is lower alkyl; lower alkyl substituted with cyclohexyl, phenyl, phenoxy, lower alkoxy, halogen or cyano; allyl; cyclohexyl; or phenyl;
R¹⁸ is lower alkyl;
R¹⁹ is alkylene, alkylene-O-alkylene, alkylene-SO₂-alkylene, alkylene-phenylene-alkylene, alkylene-O-phenylene-alkylene,

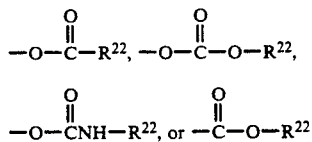

provided that component (iii) constitutes about 10 to 40 weight percent of concentrate.

39. A colored semicrystalline powder having an average particle size of less than 30 microns comprising a partially-crystalline polyester which had been modified by dissolution-crystallization-precipitation to impart increased crystallinity thereto comprised of:
(i) diacid residues consisting of at least 80 mole percent terephthalic acid residues, 2,6-naphthalenedicarboxylic acid residues, 1,3-cyclohexanedicarboxylic acid residues, 1,4-cyclohexanedicarboxylic acid residues or a mixture thereof;
(ii) diol residues consisting of at least 50 mole percent of residues having the formula -O-(CH₂)$_p$-O- wherein p is 4 to 12; and
(iii) residues of one or more methine colorant compounds having the formula:

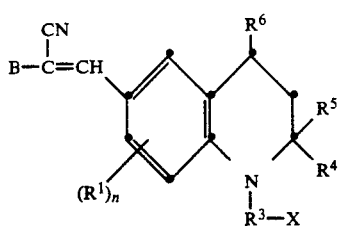

wherein
B is a radical having the formula:

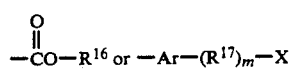

wherein R¹⁶ is an unsubstituted or substituted alkyl, cycloalkyl or aryl radical; Ar is a divalent, aromatic, carbocyclic or heterocyclic radical; R¹⁷ is a divalent linking group; and X is defined below;
R¹ is lower alkyl, lower alkoxy or halogen;
R³ is a divalent organic group;

R⁴, R⁵, and R⁶ are the same or different and each represents hydrogen or lower alkyl;
n is 0, 1, 2 or 3; and
X is hydroxy, carboxy or an ester radical having the formula:

$$-O-\overset{O}{\underset{\|}{C}}-R^{22}, -O-\overset{O}{\underset{\|}{C}}-O-R^{22},$$

$$-O-\overset{O}{\underset{\|}{C}}NH-R^{22}, \text{ or } -\overset{O}{\underset{\|}{C}}-O-R^{22}$$

wherein R²² is unsubstituted or substituted alkyl, cycloalkyl or aryl radical; provided that component (iii) constitutes at least 5.0 weight percent of the concentrate.

40. A colored semicrystalline powder according to claim 34 comprising a polyester having an inherent viscosity of at least 0.20 and a melting temperature of at least 110° C. comprised of:
(i) diacid residues consisting of at least 80 mole percent terephthalic acid residues;
(ii) diol residues consisting of at least 80 mole percent of residues of 1,4.butanediol; and
(iii) residues of one or more methine colorant compounds having the formula:

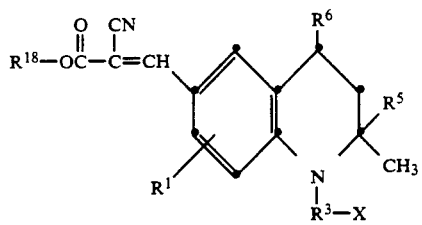

wherein
R¹ is hydrogen, methyl, methoxy, ethoxy, or chloro;
R³-X is alkylene-OH, alkylene-O-alkylene-OH, alkylene-O$\overset{O}{\underset{\|}{C}}$-alkyl, alkylene-O$\overset{O}{\underset{\|}{C}}$O-alkyl, alkylenephenylene-$\overset{O}{\underset{\|}{C}}$O-alkyl, alkylene-O-phenylene-$\overset{O}{\underset{\|}{C}}$O-alkyl or alkylene-O-alkylene-O$\overset{O}{\underset{\|}{C}}$-alkyl wherein each alkylene contains 2 to about 4 carbon atoms and each alkyl contains up to about 4 carbon atoms; and
R⁵ and R⁶ each is hydrogen or methyl; and
R¹⁸ is lower alkyl; provided that component (iii) constitutes about 10 to 40 weight percent of concentrate.

* * * * *

UNITED STATES PATENT AND TRADEMARK OFFICE
CERTIFICATE OF CORRECTION

PATENT NO. : 5,106,942
DATED : April 21, 1992
INVENTOR(S) : James J. Krutak et al It is certified that error appears in the above-indentified patent and that said Letters Patent is hereby corrected as shown below:

Column 46, line 42 (Claim 3, line 15), "$R^1$ is hydrogen, methoxy, ethoxy, or chloro;" should be --- $R^1$ is hydrogen, methyl, methoxy, ethoxy, or chloro;---.

Column 55, line 20 (Claim 17) please delete "phenylene-alkylene,".

Column 68, line 65 (Claim 38, line 8) "$-O-(CH2)_p-O-$"; should be —— $-O-(CH_2)_p-O-$ ——.

Signed and Sealed this

Twenty-first Day of June, 1994

Attest:

BRUCE LEHMAN

Attesting Officer     Commissioner of Patents and Trademarks